(12) United States Patent
Nakamura et al.

(10) Patent No.: US 7,660,991 B2
(45) Date of Patent: Feb. 9, 2010

(54) EMBEDDING, PROCESSING AND DETECTION OF DIGITAL CONTENT, INFORMATION AND DATA

(75) Inventors: Taiga Nakamura, Tokyo-to (JP); Ryuki Tachibana, Yamato (JP); Shuichi Shimizu, Yokohama (JP); Seiji Kobayashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1646 days.

(21) Appl. No.: 09/946,408

(22) Filed: Sep. 5, 2001

(65) Prior Publication Data

US 2002/0095577 A1    Jul. 18, 2002

(30) Foreign Application Priority Data

Sep. 5, 2000    (JP)    ............................. 2000-268989

(51) Int. Cl.
*G10L 19/00* (2006.01)
*G06K 9/00* (2006.01)
*G06K 9/52* (2006.01)
*H04L 9/32* (2006.01)

(52) U.S. Cl. ........................ 713/176; 382/100; 382/190

(58) Field of Classification Search ................. 713/176; 382/100

See application file for complete search history.

(56) References Cited

U.S. PATENT DOCUMENTS

| | | | | |
|---|---|---|---|---|
| 5,835,639 | A * | 11/1998 | Honsinger et al. | 382/278 |
| 6,141,753 | A * | 10/2000 | Zhao et al. | 713/176 |
| 6,240,121 | B1 * | 5/2001 | Senoh | 375/130 |
| 6,301,663 | B1 * | 10/2001 | Kato et al. | 713/176 |
| 6,332,030 | B1 * | 12/2001 | Manjunath et al. | 382/100 |
| 6,359,999 | B1 * | 3/2002 | Moriwaki et al. | 382/100 |
| 6,370,319 | B1 * | 4/2002 | Matsumoto et al. | 386/94 |
| 6,400,826 | B1 * | 6/2002 | Chen et al. | 382/100 |
| 6,404,926 | B1 * | 6/2002 | Miyahara et al. | 382/232 |

(Continued)

FOREIGN PATENT DOCUMENTS

JP    2000-156781    6/2000

(Continued)

OTHER PUBLICATIONS

Fridrich, Jiri "A Hybrid Watermark for Tamper Detection in Digital Images", 1999, ISSPA '99, pp. 301-304.*

*Primary Examiner*—Matthew T Henning
(74) *Attorney, Agent, or Firm*—Ido Tuchman; Kenneth R. Corsello

(57) ABSTRACT

Enables identification and detection of processing and type of digital content, while using multiple electronic watermarks. One embodiment provides a data processing detection system having an embedding apparatus for adding a predetermined additional signal to digital content, including a watermark design unit and embedding signal generators for generating multiple types of additional signals, correlated with each other and of differing robustness from each other for the processing of the content data, and a synthesis unit for adding the multiple types of additional signals to the content data; and detection apparatus for detecting additional signals in the digital content, and for detecting the additional signals embedded by the embedding apparatus, including an individual detector for detecting in the content data multiple additional signals, and a determination unit for examining deterioration levels of the additional signals to determine the type of processing performed for the content data.

32 Claims, 12 Drawing Sheets

U.S. PATENT DOCUMENTS

| | | | |
|---|---|---|---|
| 6,591,365 B1 * | 7/2003 | Cookson | 713/176 |
| 6,636,615 B1 * | 10/2003 | Rhoads et al. | 382/100 |
| 6,714,683 B1 * | 3/2004 | Tian et al. | 382/240 |
| 6,721,437 B1 * | 4/2004 | Ezaki et al. | 382/100 |
| 6,901,514 B1 * | 5/2005 | Iu et al. | 713/176 |
| 6,909,784 B1 * | 6/2005 | Sugahara | 380/201 |
| 6,912,658 B1 * | 6/2005 | Glogau et al. | 713/176 |
| 6,944,313 B1 * | 9/2005 | Donescu | 382/100 |
| 6,952,774 B1 * | 10/2005 | Kirovski et al. | 713/176 |
| 6,954,856 B1 * | 10/2005 | Kohashi et al. | 713/176 |
| 6,973,195 B1 * | 12/2005 | Matsui | 382/100 |

FOREIGN PATENT DOCUMENTS

JP    2000-165248    6/2000

* cited by examiner

EMBEDDING, PROCESSING AND DETECTION OF DIGITAL CONTENT, INFORMATION AND DATA

FIELD OF THE INVENTION

The present invention relates to an electronic watermarking technique that is used to detect whether digital content has been copied or altered.

BACKGROUND

Since it is easy to copy digital content (hereinafter referred to simply as content), as well as to alter it, unauthorized users can readily copy or alter such content. Recently, for example, digital music content, such as CD (compact disk) recordings, has become popular as one example of music distribution. In addition, an audio compression technique is also available that can compress data of the music content, without greatly deteriorating the tone quality. Thus, an activity tends to occur that the data of music content, such as on a CD, are compressed and the compressed data are distributed via a network, such as the Internet.

In order to prevent this activity, a method is required whereby it is possible to distinguish between data constituting original content and legal copies thereof from unauthorized copies. For this purpose, electronic watermarking techniques, or electronic signing techniques, have been developed.

Electronic watermarking is a technique whereby predetermined watermark information is embedded, as an additional signal, in content data. Once such watermark information has been embedded in content data, a special computer processing application is employed to detect the watermark information so it can be used for content authentication. That is, when the content data is changed by altering the content, the watermark information detected from the content data is accordingly changed (deteriorated). Thus, the alteration of the content can be identified by examining the state of the watermark information.

Various methods for inserting electronic watermarks into content have been proposed, and various conditions, such as the resistance of the watermark, can be selected by setting the embedding level and the embedding position of the watermark information to the content data. The robustness of watermarks represents the level whereat watermark information, i.e., an additional signal, can be maintained relative to an alteration of content data effected by content processing. That is, an electronic watermark that can be detected even after content data has been greatly altered possesses high resistance to the deterioration that results from processing. Whereas an electronic watermark that can be detected only when little processing or altering of content data has taken place has low resistance to such deterioration.

An electronic watermark that exhibits exceptionally high resistance to the deleterious effects accruing from the alteration of content data and that is resistant to all forms of processing is referred to herein as a robust electronic watermark. While an electronic watermark that exhibits low resistance to the processing of content data and that suffers great deterioration, even when content data is only slightly altered, is herein referred to as a fragile electronic watermark. And an electronic watermark that exhibits an intermediate resistance to the processing of content data, suffering great deterioration when subjected to a specific type of processing but resisting the potentially damaging effects of other types of processing, is herein referred to as a semi-fragile electronic watermark.

When a content creator embeds a robust electronic watermark in content data, the electronic watermark, even after the copying or the processing of the content data, need only be detected for the creator of the original content data to be identified. Further, when a fragile electronic watermark is embedded in content data, since only a little data processing is required for the electronic watermark to be deteriorated, whether the data has been processed can be readily ascertained.

In addition, when a semi-fragile electronic watermark is embedded in content data, it can easily be ascertained whether a specific process, one by which the electronic watermark is easily deteriorated, has been performed. For example, when content data for digital music, such as that which has been recorded on a CD, are compressed, as a result of the compression processing, generally, the amount of data retained in low frequency bands is reduced only a small amount, while in high frequency bands, to reduce the size of the musical content, as great an amount of data is deleted as it is possible without degrading the tone quality. Therefore, when the music content has been compressed, watermark information embedded only in the high frequency bands of the content data is destroyed. Determination as to whether the music content has been compressed can be ascertained by performing an electronic watermark detection process.

When digital music content is distributed via a network, data compression is generally performed in order to reduce the amount of data to be transmitted. Therefore, when a semi-fragile electronic watermark, which suffers deterioration when data is compressed, has been embedded in digital music content, if deterioration of the electronic watermark is detected it is assumed that the music content has been compressed, and the possibility exists that the music content was distributed by an unauthorized user. Furthermore, means for preventing the copying and the alteration of data by unauthorized users has also been proposed that uses both the electronic watermarking technique and an electronic signing technique.

Electronic signing is a technique whereby signature information is added to data to guarantee the legality of content. Assume that a creator, A, of predetermined digital data m employs the electronic signing technique to prove that he or she prepared the digital data m. In this case, first, creator A generates a signature s, comprising digital data that differ from the digital data m, using a signature function S and the digital data m.

$$s=S(m)$$

Creator A retains the signature function S, a secret function that is not distributed to other parties, and transmits the paired digital data m and signature s to a third party, B. Then, upon the receipt of the digital data m and the signature s, to ascertain whether digital data m was actually prepared by creator A, third party B employs the verification function V and the following equation to determine whether the signature s is correct, $$\text{determination results (true or false)}=V(m,s).$$

The verification function V returns a logical true when s=(Sm), and a logical false in all other cases. Since this verification function V is distributed by creator A, the function can be obtained by third party B. Finally, when the result obtained by using the verification function V is true, third party B can confirm that the digital data m is correct when the result obtained using the verification function V is true, or that the digital data m is not correct when the result obtained using the verification function V is false.

As is described above, since the signature s that is generated depends on the digital data m, if even one bit of the digital data m is changed, accordingly, the value returned for the signature s will be entirely different. That is, for digital data m', obtained by altering the digital data m, V(m',s)

is always false. Thus, a change in the data effected by the processing of the digital data m can be detected.

Next, assume that a forger O prepares digital data x and forges a signature s for a creator A, in order to falsely represent that the digital data x was prepared by creator A. Since forger O does not know the signature function S, the forger can not directly calculate s=S(x).

And even though theoretically it would be possible for forger O to use

V(x,z)

to calculate all possible signature values z, and eventually to find a z=s that would return a logical true when used in V(x,z), in actuality, the amount of time that would have to be expended to obtain a value that corresponds to the correct signature s would be enormous, and realistically, such a search would be impossible.

However, while the electronic watermarking or the electronic signing technique can detect the copying or the processing of content, advantageously, more detailed information should be obtained in order to eliminate unauthorized copying and distribution. For example, since the above described music content may be distributed or copied legally via a network, means is required that can distinguish between authorized copying and distribution and unauthorized copying and distribution.

When the fragile electronic watermark that is easily destroyed by copying or alteration is used, the possibility that content data has been copied or processed can be detected. However, in this case, the content in which the electronic watermark is embedded and that is being distributed can not be distinguished from the content in which the electronic watermark was originally embedded.

Therefore, to prevent the unauthorized copying and distribution of content, simple detection performed to determine whether the content data have been changed is not sufficient, and a technique is required that satisfies the following conditions:

1. The content is a target the alteration of which can be detected.
2. The content has been changed and the type of change can be identified.
3. The copying and alteration of the content can not be hidden.

The hiding of copying and changing of content is a process used to disguise content that has been copied or altered and make it appear to be content that has not been copied or changed.

In the above description given for music content, the watermark information embedded in high frequency bands is destroyed during the compression of the content data. However, when the same data as the watermark information embedded in the high frequency band is obtained by using a specific method, and is added to content data that has been decompressed, the watermark information is distinguished from compressed content data, so that in appearance this data does not differ from the content data that has not been compressed. Therefore, this processing is effectively avoided to prevent the unauthorized copying and distribution of content.

Conventionally, the type of processing used for content is identified, to a degree, by embedding in the content multiple types of electronic watermarks having different resistances. However, as is described above, processing performed to hide the copying and handling of the content can not be prevented. The copying or the processing of content is not easily performed by using electronic watermarking and another encryption technique; however, basically, the processing performed to hide the copying or the handling of content can not be prevented.

When unauthorized copying or processing is to be prevented by using electronic signing, even a slight change in the content data is detected, while on the other hand, even authorized processing can not be performed for the content data. Further, since the determination results are false for all changes of content data, the processing type and the processing level can not be identified.

SUMMARY OF THE INVENTION

It is, therefore, an aspect of the present invention, while using multiple electronic watermarks, to enable the determination of whether content is a target for the detection of the handling thereof, to enable the identification and detection of the processing and the type of content, and to prevent the copying and processing of content from being hidden.

Another aspect of the present invention is to provide a data processing detection system. In an example embodiment, the data processing detection system includes: an embedding apparatus, for adding a predetermined additional signal (i.e., a signal that forms an electronic watermark) to content data for digital content, including additional signal generation means, for generating multiple additional signals, which differ in robustness from each other as for the processing of the content data, and addition means, for adding the multiple additional signals to the content data; and a detection apparatus, for detecting the additional signals added to the content data, including additional signal detection means, for detecting, in the content data, the multiple additional signals, and determination means, for examining, based on the additional signals detected by the additional signal detection means, the deterioration levels of the additional signals to determine the type of processing performed for the content data.

The additional signal generation means, of the embedding apparatus, generates multiple additional signals correlated with each other, and the detection apparatus further includes relationship evaluation means for determining whether the relationships among the additional signals have been maintained. The additional signal detection means detects the additional signals embedded in the content data multiple times, and the determination means statistically processes the additional signals, performing the detection process multiple times, and determines the type of processing performed for the content data. When the detection apparatus includes the relationship evaluation means, whether the relationships among the additional signals have been maintained is determined by statistically processing the evaluation results obtained by the relationship evaluation means.

According to the present invention, an additional information embedding apparatus, configured as subsequently described in this paragraph, is provided. Such an additional information embedding apparatus, for adding additional information to digital content to determine whether the digital content has been processed, comprises: an additional information generator, for preparing multiple sets of additional information that are correlated with each other; an additional signal generator, for generating data, based on the additional information, that corresponds to a predetermined data form for the digital content; and a synthesis unit, for synthesizing data generated by the additional signal generator and content data for the digital content, wherein, to determine whether the digital content has been processed, the additional information added to the digital content is detected, and the level of deterioration of the obtained additional information is detected.

Different embodiments employ various methods to correlate additional information obtained by the additional information generator. For example, a mapping relationship defined by a predetermined function is established for the additional information. Further, when a predetermined process is performed by using multiple sets of additional information as elements, a relationship, for obtaining specific information (i.e., a specific value is obtained by adding multiple sets of information, or information having a specific meaning is formulated), can be established. In addition, information required for the detection of other additional information for the digital content (i.e., information indicating the recording position of additional information) is provided for the predetermined additional information.

Based on multiple sets of additional information, the additional signal generator prepares multiple sets of data exhibiting differing resistances to the processing performed for the content data of the digital content.

Furthermore, according to the present invention, an additional information detection apparatus, configured as subsequently described in this paragraph, is provided. Such an additional information detection apparatus, for detecting additional information, added to digital content, to determine whether the digital content has been processed, comprises: an individual information detector, for detecting each of multiple correlated additional information sets embedded in content data for digital content; a relationship evaluation unit, for evaluating relationships among the multiple additional information sets that are obtained; and a determination unit, for determining, based on the detection and evaluation results, whether the content data has been processed, and for determining, when the content data has been processed, the type of processing performed.

The individual information detector may detect other additional information based on predetermined additional information detected in the content data. Or the individual information detector may detect additional information based on the characteristic of the data form of the content data.

According to the invention, digital content includes but is not limited to: content data and multiple sets of watermark data, which in robustness differ from the content data, wherein the multiple watermark data are correlated with each other. Moreover, according to the present invention, a music content processing apparatus, is provided. In an example embodiment the music content processing apparatus includes: an additional information generator, for generating multiple correlated sets of additional information; an additional signal generator, for generating, based on the additional information, multiple sets of data that correspond to the data form of music content; and a synthesis unit, for synthesizing data obtained by the additional signal generator and content data for the music content, wherein the synthesis unit synthesizes the multiple data sets, so that, at least one of the multiple data sets is embedded in a data portion in a high frequency band of the music content, and so that at least another data set of the multiple data sets is embedded in a data portion in a low frequency band of the music content.

Thus, according to the present invention, a music content processing apparatus is provided for detecting additional information embedded in music content, and for controlling the processing of the music content. In an example embodiment, the music content processing apparatus includes: an individual information detector, for detecting each of multiple additional information sets embedded in the content data for music content; a relationship evaluation unit, for evaluating relationships among the multiple sets of additional information; and a determination unit, for determining, based on the detection and evaluation results, whether the content data has been processed, and for determining, when the content data has been processed, the type of processing performed, wherein, when it is ascertained, based on the relationships among the multiple sets of additional information, that the additional information has been added to data portions in both the high frequency bands and the low frequency bands of the music content, and when the relationships among the multiple sets of additional information have been destroyed or when the deterioration of the additional information embedded in the data portion of the high frequency bands has occurred, the determination unit inhibits the processing of the music content.

Furthermore, according to the present invention, provides an additional information embedding method, configured as subsequently described. The method is for embedding of predetermined additional information in digital content. An example embodiment of the additional information embedding method, for adding additional information to digital content to determine whether the digital content has been processed, includes the steps of: generating multiple sets of additional information that are correlated with each other and that correspond to the data form of predetermined digital content; and synthesizing the additional information and content data for the digital content.

Still furthermore, according to the present invention, a content process detection method having the following configuration is provided. The content process detection method includes the steps of: detecting, from content data for digital content, multiple sets of additional information that are correlated with each other, but that in robustness differ from each other; evaluating relationships existing between the multiple sets of additional information; and determining, based on the detected additional information and the evaluation of the relationships, whether the content data has been processed, and determining the type of processing performed when the content data has been processed.

Further, according to the present invention, a program is provided to permit a computer to perform the processing that corresponds to the steps of the additional information embedding method and the content processing detection method. A storage medium on which that program is stored or a program transmission apparatus for transmitting the program is also provided.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE SYMBOLS

Figure 1:
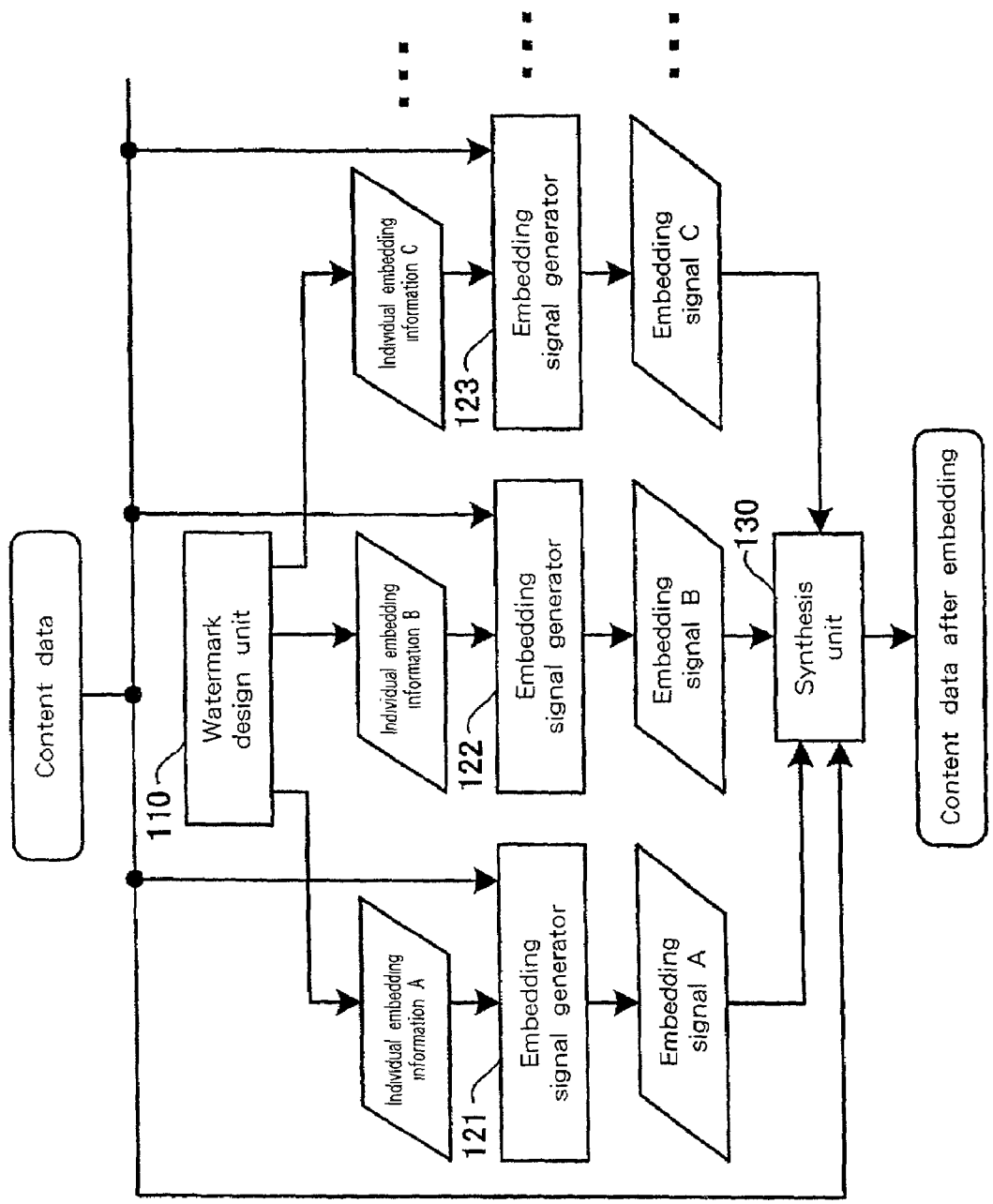
FIG. 1 is a diagram showing the configuration of an embedding apparatus, according to an example embodiment of the present invention for embedding an electronic watermark in content.

110: Watermark design unit
121 to 123: Embedding signal generators
130: Synthesis unit
211 to 213: Individual detectors
220: Relationship evaluation unit
230: Determination unit

DESCRIPTION OF THE INVENTION

An advantageous embodiment of the present invention is described in detail while referring to the accompanying drawings following a descriptive overview of the invention. According to the invention, multiple types of electronic watermarks, which differ in their characteristics in accordance with the type of digital content copying or altering they perform, are embedded as additional signals (additional data) in content data for digital content, while sets of watermark information, for the electronic watermarks that are to be embedded, are correlated with each other. Later, when individual embedded electronic watermarks are detected, it can be determined whether the content was a target and detect whether it has been processed. In the event, whether or not the content has been processed and the type of processing performed can be detected separately. Further, since multiple types of embedded electronic watermarks are correlated with each other and the same data as the watermark information embedded in the content data is available after processing has been performed, it is difficult to hide evidence that processing of the content data has been performed.

When embedding the above multiple types of electronic watermarks in content, embedding means implements the electronic watermarking technique of the invention and the detection means, for individually detecting the electronic watermarks in the content and for determining whether copying and processing has been performed.

FIG. 1 shows a diagram of an example of a configuration of an embedding apparatus according to the embodiment of the invention used for embedding electronic watermarks in content. In FIG. 1, a watermark design unit 110 prepares watermark information for embedding in content, while embedding signal generators 121 to 123, based on the watermarks provided by the watermark design unit 110, generate signals (digital data) that are also to be embedded. In FIG. 1, three embedding signal generators, 121 to 123, are shown; however, in accordance with the number of electronic watermarks that are to be embedded, an arbitrary number of embedding signal generators can be provided. A synthesis unit 130 synthesizes the embedding signals produced by the embedding signal generators 121 to 123 with the content data for the content targeted for the embedment of electronic watermarks.

With this configuration, the watermark design unit 110 is an additional information generator for watermark information generation, i.e., the additional information to be added to content. The watermark design unit 110 generates sets of watermark information to be embedded in the content in a number equivalent to the number of electronic watermarks to be embedded. Hereinafter, individual watermark information sets generated by the watermark design unit 110 are refereed to as individual embedding information). The sets of individual embedding information generated by the watermark design unit 110 are correlated with each other.

An arbitrary method is employed to correlate multiple sets of individual embedding information. One relationship may be established for all the individual embedding information sets, or a correlation may be established for groupings of several sets each. Specifically, the following methods is employed to correlate individual sets of embedding information.

1. The same contents are provided for multiple sets of individual embedding information.
2. A mapping relationship, determined by a predetermined function, is established among the multiple sets of individual embedding information (i.e., the mapping of predetermined individual embedding information is another method for providing specific individual embedding information).
3. A mapping relationship determined by a predetermined function, the provision of which depends on a specific key (data string), is established among multiple sets of individual embedding information.
4. A mapping relationship determined by a predetermined function, the provision of which depends on content data, is established among multiple sets of individual embedding information.
5. Specific information is obtained by employing a predetermined process that uses as elements all of the multiple sets of individual embedding information (e.g., a specific value is obtained by adding together all the individual embedding information values).

In same embodiments an arbitrary conventional method is employed to generate the individual embedding information. For example, the following process, which uses a vector value, may also be employed. It should be noted that individual embedding information consists of a bit string represented by 1s and 0s. First, two or more vector values x1, x2, x3, . . . are set so that they correlate with each other. The actual number of vector values is equal to the number of individual embedding information sets generated by the watermark design unit 110, and generated individual embedding information sets A, B, C, . . . respectively correspond to the vector values x1, x2, x3, . . . . 0,For example, the vector value x1 corresponds to the embedding information A, the vector value x2 corresponds to the embedding information B, and the vector value x3 corresponds to the embedding information C. The embedding information is determined using a corresponding vector value, and for this determination, an arbitrary method is employed. For example, a process for "examining a predetermined element, either positive or negative, of the vector value, and for selecting 1 when the element is positive, or selecting 0 when the element is not positive", is performed sequentially for all the elements of the vector value. Then, when the selected numerals, comprising 1s and 0s, are arranged in order, the finally obtained bit string is used as the value for the individual embedding information.

The embedding signal generators 121 to 123 generate, from the individual embedding information obtained by the watermark design unit 110, an embedding signal to be added to content data. That is, the embedding signal generators 121 to 123 are additional signal (additional data) generators for generating data, additional information that is based on the individual embedding information, that is to be directly added to content data. An embedding signal has the same form as has the content data, for target content, for the embedment of an electronic watermark. Therefore, various forms can be employed in accordance with the type of content, the type of process to be detected using the electronic watermark, and the embedding method. Then, the property of each embedding signal (i.e., the property of the electronic watermark) is determined in accordance with the signal form. In the example in FIG. 1, the embedding signal generator 121 generates an embedding signal A based on the individual embedding information A, the embedding signal generator 122 generates an embedding signal B based on the individual embedding information B, and the embedding signal generator 123 generates an embedding signal C based on the individual embedding information C.

Specifically, employing music content as an example, a frequency band for embedding an electronic watermark is designated (a high frequency band or a low frequency band), or an embedding signal is provided that is easily or is hardly deteriorated by digital/analog conversion and analog/digital conversion. Further, for music content that is recorded using multiple channels (two or four channel stereo, etc.) an embedding signal is set for each channel (in this case, watermark information can also be employed that does not have any meaning unless signals to be embedded in the channels are synthesized).

Furthermore, when video content is employed, an electronic watermark is embedded in the data portion that corresponds to a specific position on a screen, or is embedded at a specific time in a moving picture (for example, after a predetermined time, such as several seconds, has elapsed since the beginning of the reproduction of the moving picture). In addition, an electronic watermark is embedded in speech data added to the video.

As is described above, in this embodiment, the embedding signal generators 121 to 123 generate multiple types of embedding signals that have different properties. It should be noted, however, that the properties of the embedding signals do not always differ. For example, to generate embedding signals having three properties in accordance with the processing type that is to be detected, four embedding signals may be generated and the properties of two of them may be the same. The synthesis unit 130 synthesizes content data and embedding signals obtained by the embedding signal generators 121 to 123. An arbitrary synthesis method is employed; as the simplest example, the signals and the content data may be synthesized simply by adding the signals together.

Figure 2:
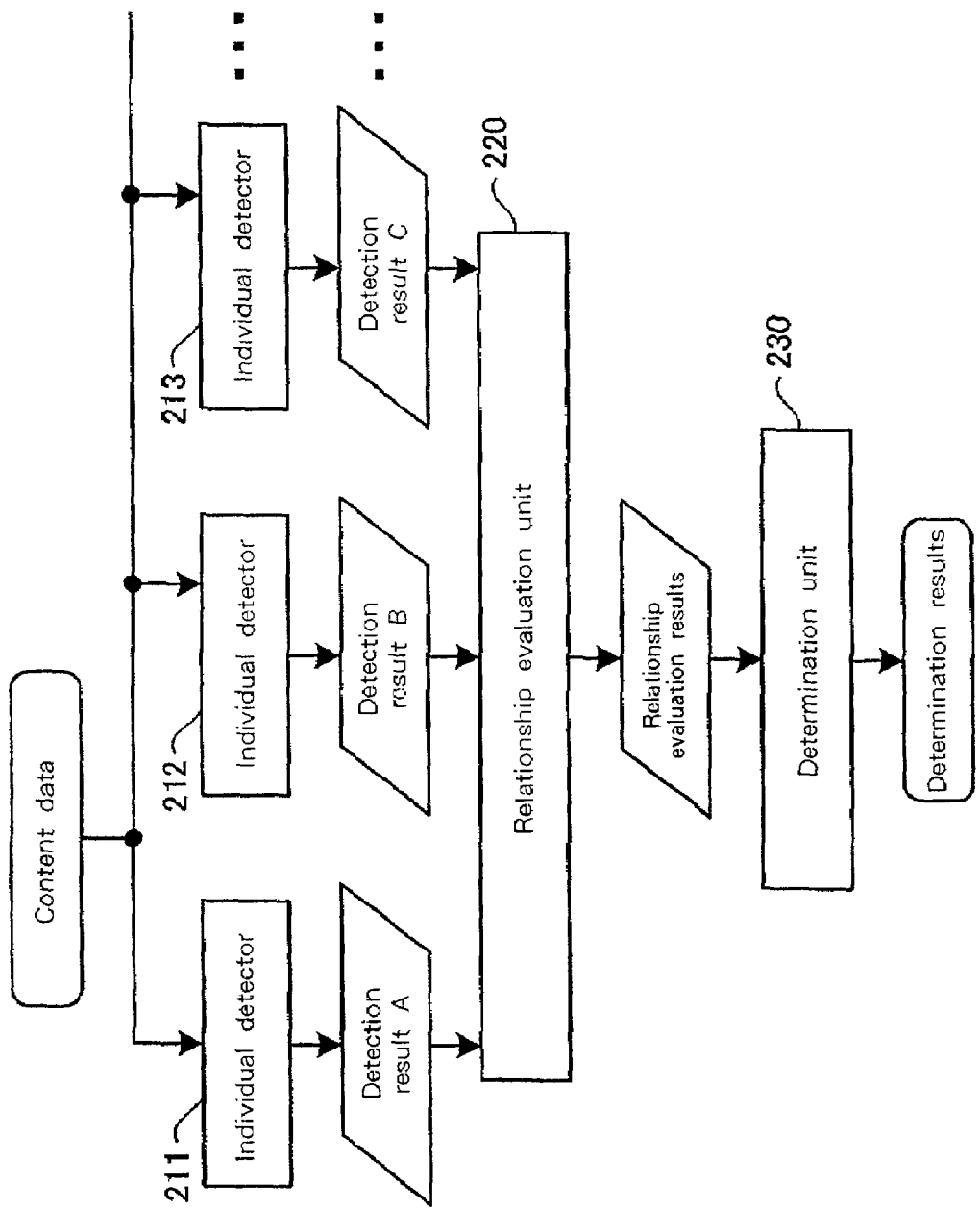
FIG. 2 is a diagram showing the configuration of a detection apparatus, according to an example embodiment for detecting an electronic watermark in content and for evaluating the electronic watermark.

FIG. 2 is a diagram showing an example of the configuration of a detection apparatus in this embodiment for detecting and evaluating an electronic watermark embedded in content. In FIG. 2, individual detectors 211 to 213 individually detect and extract an electronic watermark from content. Although in this instance, three individual detectors, 211 to 213, are provided for this purpose, an arbitrary number of detectors is provided, consonant with the number of embedded electronic watermarks. Also shown in FIG. 2, is a relationship evaluation unit 220 that reproduces the information embedded in the embedding signals extracted by the individual detectors 211 to 213, and evaluates the relationships existing among the sets of embedded information. Thereafter, in accordance with the results obtained by the relationship evaluation unit 220, a determination unit 230 determines whether copying or processing has been performed, and when processing has been performed, determines the type of processing.

With this arrangement, as the detection results, the individual detectors 211 to 213 extract the electronic watermarks from the content in which they were embedded by the embedding apparatus. The number of these individual detectors, 211 to 213, that can be provided is equivalent to the number of embedding signal generators, 121 to 123, provided for the embedding apparatus in FIG. 1. Thus, each type of multiple types of electronic watermarks can be extracted from the content. When the individual detector 211 corresponds to the embedding signal generator 121, the individual detector 211 extracts, as the detection results A, information having the same contents as the individual embedding information A.

The relationship evaluation unit 220 enters the detection results obtained by the individual detectors 211 to 213, and evaluates then to determine whether the relationships that the watermark design unit 110 in the embedding apparatus provided for the sets of individual embedding information is maintained in the detection results. For the evaluation of the detection results by the relationship evaluation unit 220, information concerning a relationship established among the sets of individual embedding information by the watermark design unit 110 is transmitted in advance to the relationship evaluation unit 220, and the relationship obtained by the detection results is compared with the relationship that is held by the relationship evaluation unit 220 and that is to be provided for the embedding information. When the relationship has been maintained, the evaluation result is true, and when the relationship has been destroyed, the evaluation result is false. Further, the degree whereat correlation among the individual detection results is maintained relative to the relationship among the sets of individual embedding information may also be represented by an actual value. Further, since the correlation of the sets of individual embedding information is arbitrarily set, one correlation may be set for all of the detection results, or one may be set for groupings of several detection results each. Therefore, more than one evaluation results may be obtained from a single content source.

Based on the evaluation results obtained by the relationship evaluation unit 220 using the detection results, the determination unit 230 determines whether copying or processing of the content has occurred, and if processing has occurred, determines type of processing.

Specifically, for a music content, for example, high frequency bands are deleted during data compression.

Therefore, when the sets of individual embedding information are embedded in the high frequency bands and in the low frequency bands of the music content, and when the sets of embedding information in the high frequency bands are destroyed, it can be assumed that the content data of the music content has been compressed.

The type of processing performed for content can be determined by examining the degree of deterioration of electronic watermarks, i.e., by determining which of multiple sets of information embedded in the content has been destroyed and which has been maintained.

Further, when sets of individual embedding information have been destroyed, this means that information will not be detected. But, when individual information is merely embedded in content, whether the embedded information was destroyed or whether the information was not originally embedded can not be determined when no information can be detected. However, if individual information embedded in a high frequency band was correlated with individual information embedded in a low frequency band, and if the individual embedding information is detected in the low frequency band, it can be ascertained that the correlated information was embedded in the high frequency band.

Therefore, if individual embedding information is detected in a low frequency band of music content, and if the individual embedding information correlated with the embedding information is not detected (i.e., when the relationship evaluation unit 220 determines that a relationship is not maintained), it can be assumed that the music content has been processed. It should be noted, however, that for this determination, it is necessary to confirm that the individual embedding information that was not detected was actually embedded in the high frequency band where it would have been destroyed by compression. This is implemented by recording a frequency band in which the sets of individual embedding information that correspond to the information embedded in the low frequency band, or by correlating the sets of individual embedding information in order to obtain the above determination based on the relationships among the sets of information.

As is described above, sometimes the relationship evaluation unit 220 outputs multiple evaluation results for one content, and in this case, the determination unit 230 receives all of these results for use in making a determination. Further, the determination unit 230 may receive the evaluation results that the relationship evaluation unit 220 obtained multiple times, and may determine, by means of a statistical decision, whether the content has been processed and the type of processing. That is, the individual detectors 211 to 213 output results obtained from multiple locations in the content (for example, when content, such as music content or video content, including a time-transient element, is employed, the detection results can be obtained multiple times in accordance with the time, e.g., the individual detection results can be obtained from the data portion when t1 seconds have elapsed from the beginning of the content, and then, can be obtained from the data portion when t2 seconds have elapsed). Then, each time output is received from the individual detectors 211 to 213, the relationship evaluation unit 220 evaluates the relationships among the individual detection results. The determination unit 230 receives all the evaluation results obtained by multiple times by the evaluation unit 220, and upon the receipt of each evaluation result, determines whether the content has been processed, and when it has, determines the type of processing. Then, when the determination results indicating that the content has been processed are statistically significant, the determination unit 230 concludes that the content has been compressed.

Figure 3:
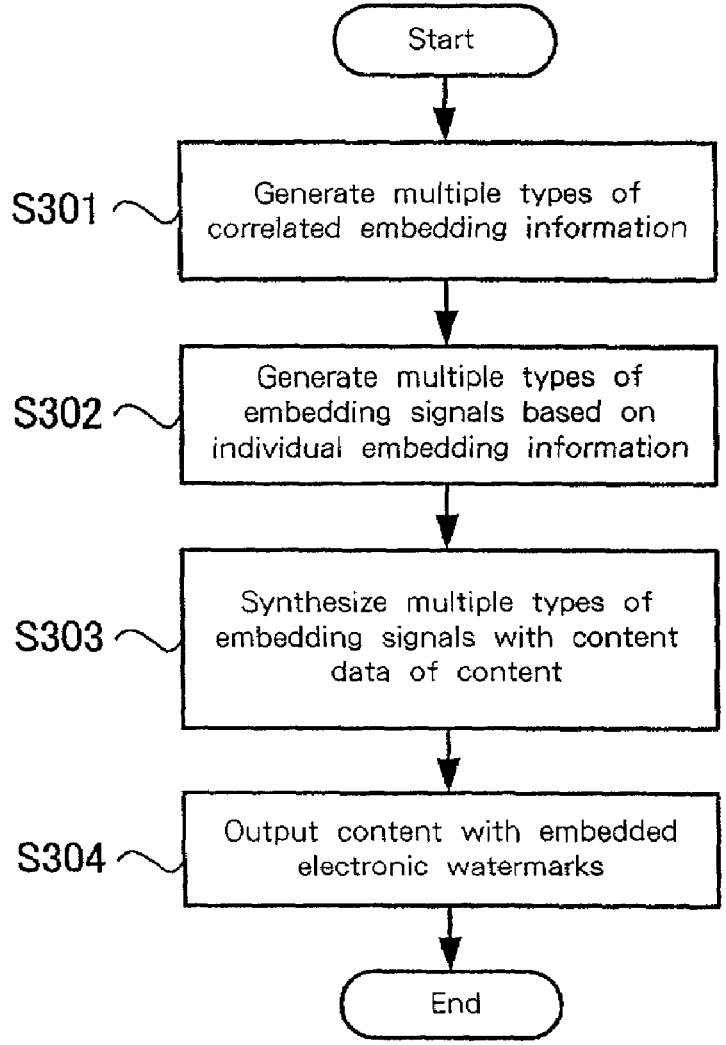
FIG. 3 is a flowchart showing an example of an electronic watermark embedding operation according to the embodiment.
Figure 4:
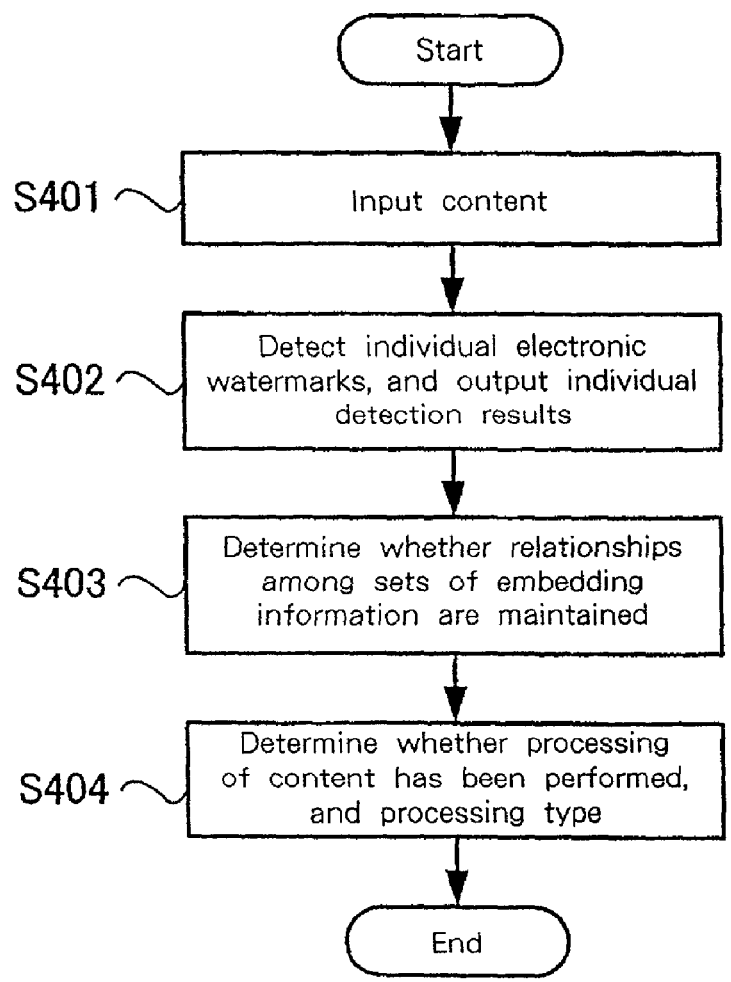
FIG. 4 is a flowchart for explaining the electronic watermark detection operation according to the embodiment.

FIG. 3 is an example of a flowchart showing an electronic watermark embedding operation according to the embodiment, and FIG. 4 is a flowchart for explaining an electronic watermark detection operation according to the embodiment. In FIG. 3, first, the watermark design unit 110 of the embedding apparatus prepares multiple types of individual embedding information that are correlated with each other (step 301). Subsequently, the embedding signal generators 121 to 123 generate multiple types of embedding signals based on the individual embedding information (step 302). Then, the synthesis unit 130 synthesizes the embedding signals with the content data of the content (step 303). As a result, multiple types of correlated electronic watermarks are embedded in the content (step 304).

In FIG. 4, shows and example of detection apparatus which receives predetermined content (step 401), and the detectors 211 to 213 individually detect and output an electronic watermark embedded in the content (step 402). Then, the relationship evaluation unit 220 examines the detection results to determine whether the relationship provided for the individual embedding information was maintained (step 403). Finally, based on the results obtained by the individual detectors 211 to 213 and the evaluation of the relationship performed by the relationship evaluation unit 220, the determination unit 230 determines whether the content has been processed, and if it has, determines the type of processing (step 404).

The embedding apparatus is provided for a server machine that distributes content via a network, or a recording apparatus that records content on a predetermined storage medium. The detection apparatus is provided for a reproduction apparatus (including a client machine having a reproduction application program) that reproduces the content, or a copier that copies the content. The components of the embedding apparatus and the detection apparatus are virtual software blocks, and are implemented by a CPU under the control of a computer program. The computer program that controls the CPU is provided by storing it on a storage medium, such as a CD-ROM or a floppy disk, or by transmitting it via a network.

As one of the general usage forms of this embodiment, in the preparation of content or in the production and the distribution of a storage medium on which content is stored, the embedding apparatus embeds an electronic watermark in the content, and in the reproduction of the content or the recording of the content on another storage medium, the detection apparatus detects the electronic watermark and examines it to determine whether processing of the content has been performed. As another example, the embedding apparatus embeds an electronic watermark in content and distributes the content via a network, and a detection apparatus connected to the network obtains the content at random and examines the obtained electronic watermark to determine whether processing of the content has been performed. In this fashion a service can be provided and distributed via a network for examining content to determine whether illegal processing has been performed.

The embedding apparatus and the detection apparatus in FIGS. 1 and 2 have a functional block required for the embedding and detection of an electronic watermark. Further, for an actual operation, a modification can be employed. For example, predetermined message information may be added to the electronic watermark information, or the watermark information may be prepared, depending on a predetermined key (data string).

Figure 5:
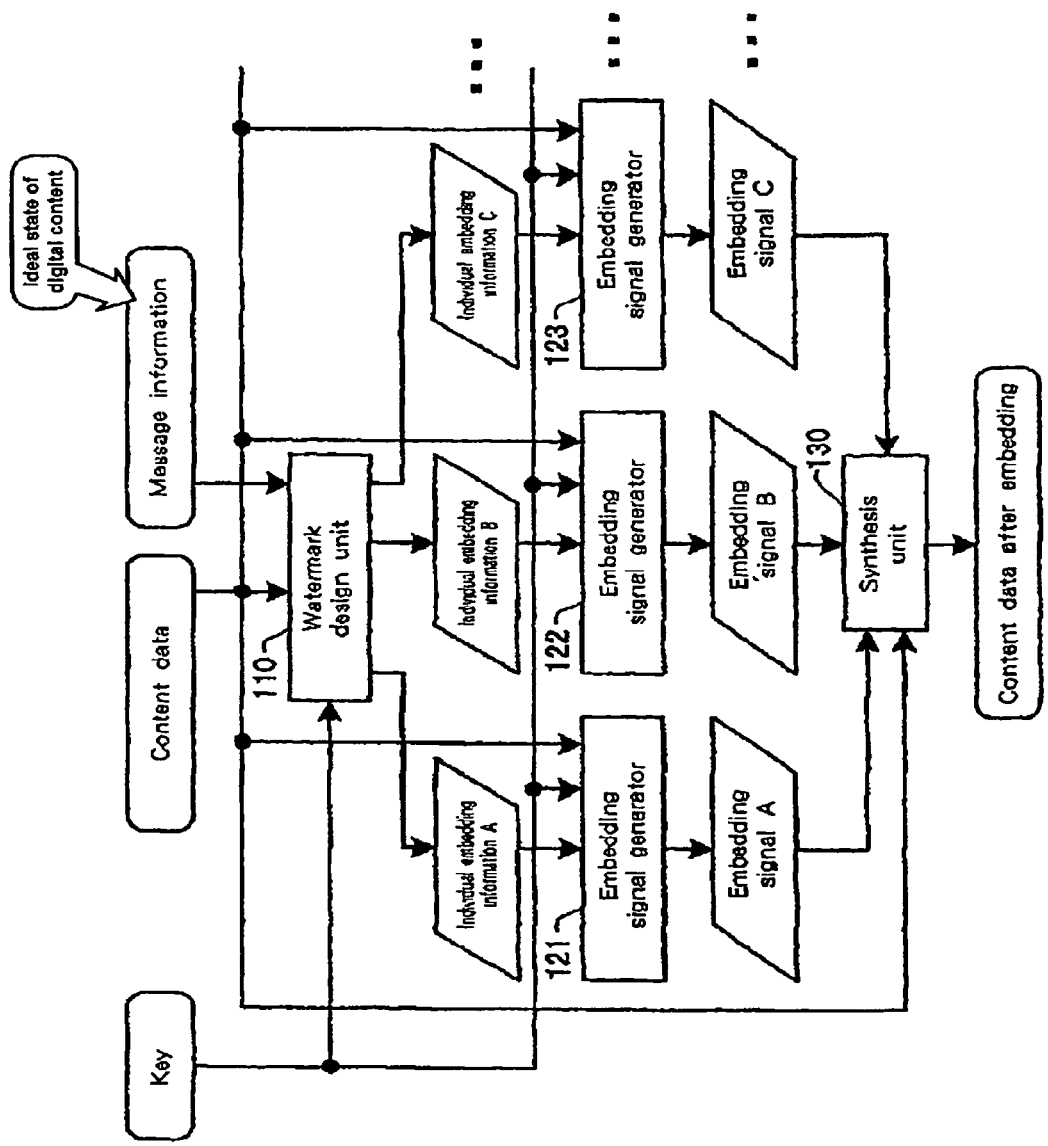
FIG. 5 is a diagram showing the configuration of the embedding apparatus used when predetermined message information is inserted in watermark information, and when the watermark information depends on a predetermined key.
Figure 6:
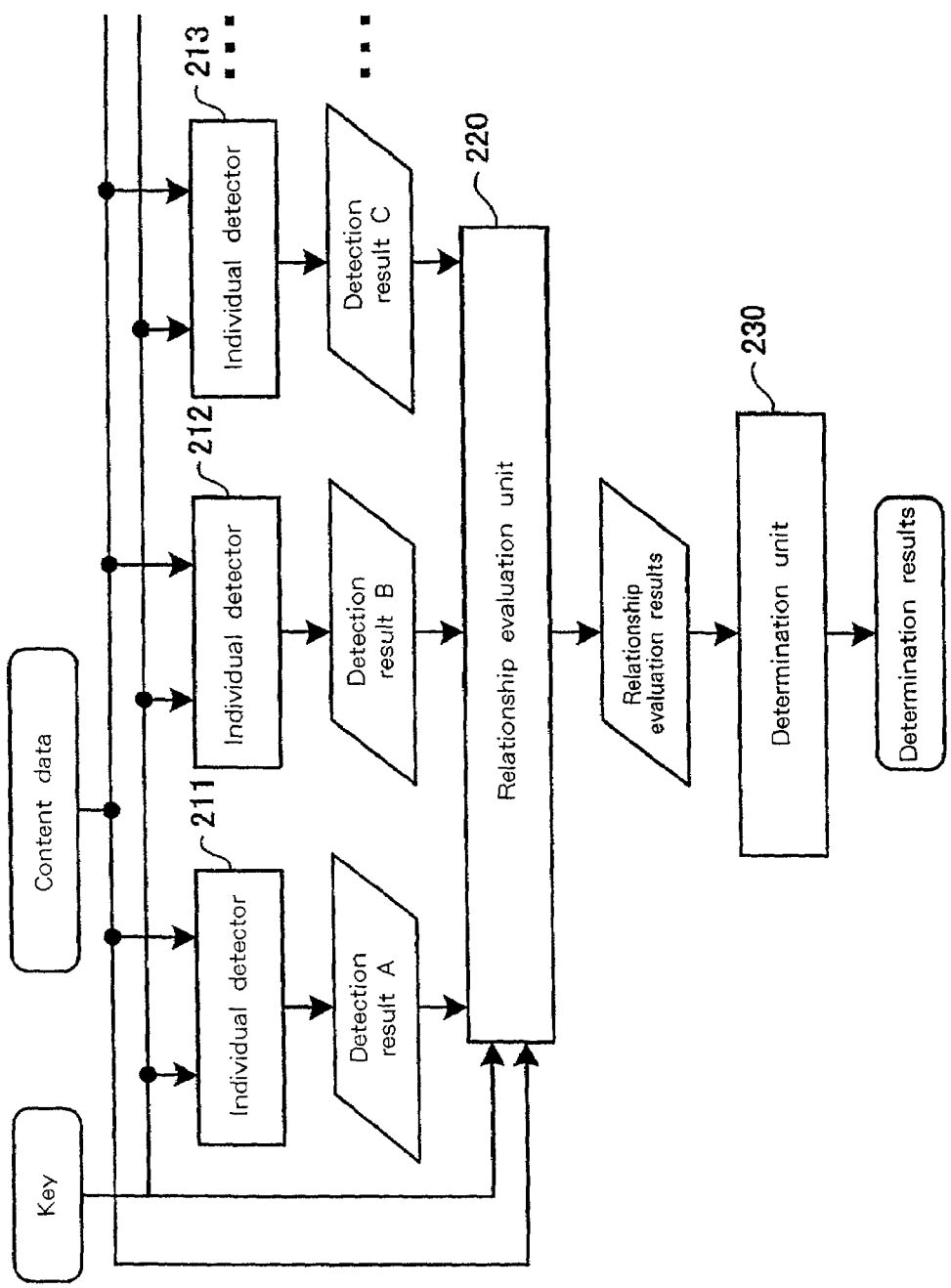
FIG. 6 is a diagram showing the configuration of the detection apparatus used when predetermined message information is inserted in watermark information, and when the watermark information depends on a predetermined key.

FIG. 5 is a diagram showing the configuration of an embedding apparatus used to insert a predetermined message into watermark information and to permit the watermark information to depend on a predetermined key. FIG. 6 is a diagram showing a detection apparatus for the same operation. In FIG. 5, the watermark design unit 110 and the embedding signal generators 121 and 123 receive a key, which the watermark design unit 110 employs to prepare individual embedding information, and which the embedding signal generators 121 to 123 employ to generate an embedding signal. The watermark design unit 110 and the embedding signal generators 121 and 123 can use the key arbitrarily. For example, the watermark design unit 110 can use the key to determine a data string and, a function that correlates individual embedding information, and the embedding signal generators 121 to 123 can employ the key to determine a condition for the generation of an embedding signal using the embedding information. In addition, since in FIG. 5 the key is transmitted to both the watermark design unit 110 and the embedding signal generators 121 to 123, the key may be employed by either the unit 110 or the generators 121 to 123.

Furthermore, in FIG. 5, the watermark design unit 110 also receives the content data. The watermark design unit 110 can then, while depending on the content data, generate the individual embedding information. For example, the individual embedding information to be embedded in a predetermined frequency band of music content can be generated by using, as a key, a data string in the predetermined frequency band. Since the thus obtained embedding information depends on the content data at the location whereat the embedding information is to be embedded, the process for the reproduction and the adding of the individual embedding information can not be performed if the information is destroyed by the process (if the content data at the pertinent location are erased).

In FIG. 5, the watermark design unit 110 also receives predetermined message information, and can include the message information in the individual embedding information. For example, for music content, information concerning a recorded music piece (title of the music, the player, etc.) can be included as message information in the individual embedding information. Further, information related to the ideal state of the content can be included as message information in the embedding information. That is, information concerning the structure of content when an electronic watermark is embedded can be included in the individual embedding information. Specifically, an electronic watermark including message information, "the third channel of six for music, ID 38039, 96 kHz sampling and 16-bit dynamic range", is embedded in each channel in the music content of a six-channel stereo recording. When the electronic watermark is detected and the message is decrypted, the ideal state of the content can be understood. Then, compared with the actual state of the content, whether processing of the content has been performed can be determined.

For video content including moving pictures and speech, an identifier, ID 89741, is provided for the moving picture data, and an electronic watermark that includes having message information, "to be distributed with music bearing the identifier ID 338845", is embedded in the moving picture data. Further, an identifier, ID 338845, is provided for the speech data, and the message, "to be distributed with moving pictures bearing the identifier ID 89741", is embedded. Therefore, when the electronic watermark is detected and the message is decrypted, it is understood that the data can not be distributed unless the moving pictures and the speeches are correctly paired. Thus, the independent distribution by an activity of motion picture data and speech data can be prevented.

While in FIG. 5 all of the data for a key, the content data and the message information, are received by the watermark design unit 110, the watermark design unit 110 may receive one or both of these and employ what it receives to generate watermark information. Further, although not shown, the watermark design unit 110 can generate individual embedding information using a predetermined random string. For example, several types of data strings may be prepared, and can be selected at random as sets of individual embedding information. Of course, a randomly selected data string, a key, content data and message information may be employed together to generate individual embedding information. In addition, the conventional technique used for electronic watermarking can be employed as a method for preparing individual embedding information using a key, content data and a random data string.

In FIG. 6, the individual detectors 211 to 213 and the relationship evaluation unit 220 receive a key that the detectors 211 to 213 employ to obtain detection results from the content. When, for example, the watermark design unit 110 or the embedding signal generators 121 to 123, in the embedding apparatus in FIG. 5, encrypt embedding information or embedding signals using a predetermined key, the detectors 211 to 213 can use the predetermined key to decrypt the information. When the function for correlating the individual embedding information, which depends on the predetermined key, is determined, the relationship evaluation unit 220 can employ the predetermined key to evaluate the correlation of the individual detection results.

The same key, or different keys, such as those used for the public key encryption method, may be used by the embedding apparatus in FIG. 5 and by the detection apparatus in FIG. 6. Further, the key may be employed only when the embedding apparatus generates the individual embedding information or the embedding signal, and may not be employed when the detection apparatus obtains the individual detection results or evaluates the relationship. Thus, in some cases it is best that the key not be employed for the generation of the individual embedding information and the embedding signals, and should only be employed for the acquisition of the detection results and for the evaluation of the relationship. Any conventional technique for electronic watermarking can be employed for all of these methods.

Figure 7:
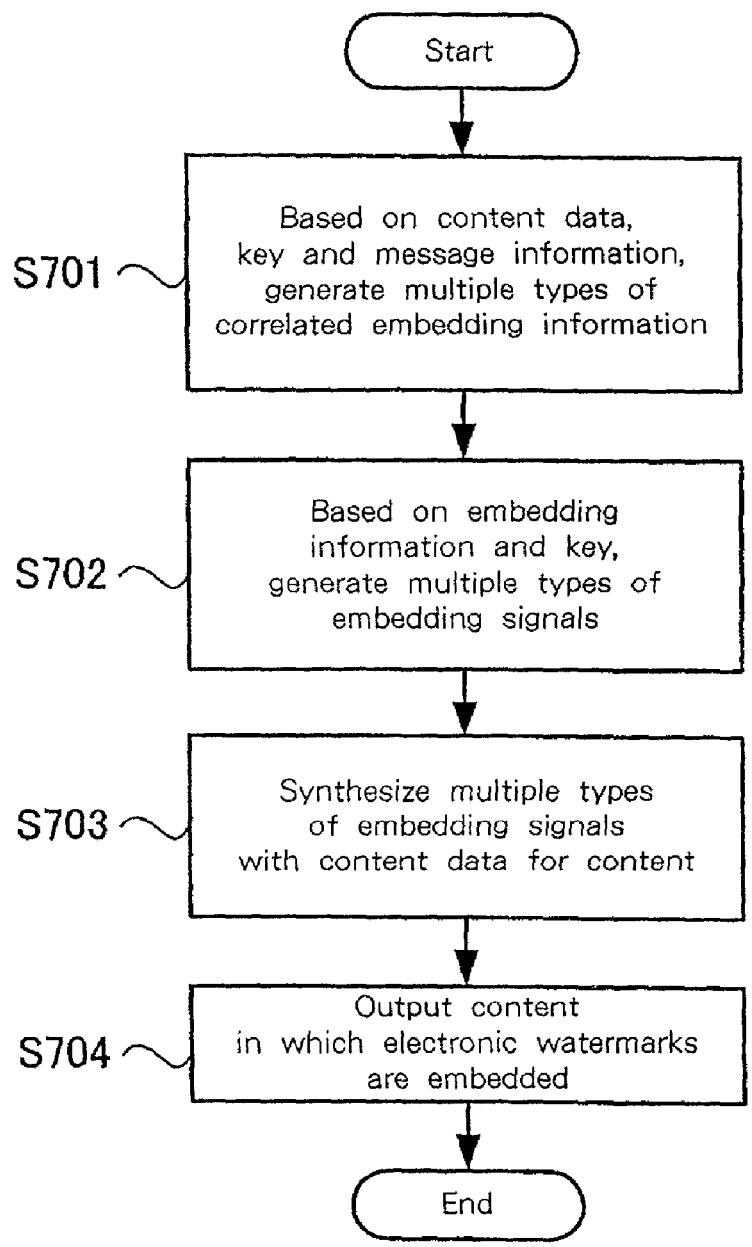
FIG. 7 is a flowchart showing an example of the electronic watermark embedding operation of the embedding apparatus in FIG. 5.

In FIG. 7, the relationship evaluation unit 220 also receives content data. Thus, when individual embedding information is prepared that depends on the content data of the content at the location whereat the information is to be embedded, the relationship evaluation unit 220 can employ the content data to evaluate the relationship that exists between the individual detection results. Although not shown, if predetermined message information is included in the individual embedding information, the message information can also be reproduced by collecting the detection results obtained by the individual detectors 211 to 213. The conventional technique used for electronic watermarking can also be employed as a method whereby the embedding apparatus inserts the predetermined message information into the embedding information, and the detection apparatus reproduces the message information.

Figure 8:
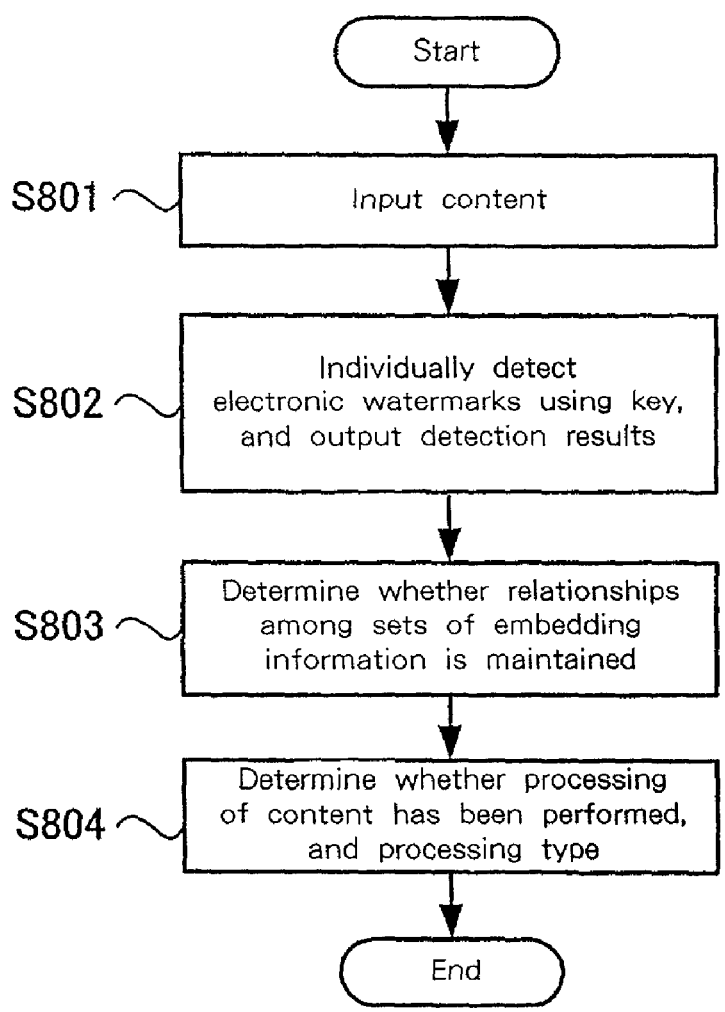
FIG. 8 is a flowchart showing an example of the electronic watermark detection operation of the detection apparatus in FIG. 6.

FIG. 7 is a flowchart showing an example of an electronic watermark embedding operation performed by the embedding apparatus in FIG. 5, while FIG. 8 is a flowchart showing an example of an electronic watermark detection operation performed by the detection apparatus in FIG. 6. In FIG. 7, first, the watermark design unit 110 of the embedding apparatus receives content data, a key and message information, and based on these data, generates multiple types of embedding information that are correlated with each other (step 701). The embedding signal generators 121 to 123 then generate multiple types of embedding signals based on the individual embedding information and the key (step 702). And following this, the synthesis unit 130 synthesizes these embedding signals with the content data of the content (step 703). As a result, multiple types of correlated electronic watermarks are embedded in the content (step 704).

In FIG. 8, the detection apparatus receives predetermined content and a key (step 801), and based on the content and the key, the detectors 211 to 213 individually detect the electronic watermarks and output the detection results (step 802). Then, the relationship evaluation unit 220 examines the detection results to determine whether the relationship provided for the individual embedding information is retained (step 803). Finally, based on the detection results obtained by the individual detectors 211 to 213 and the evaluation of the relationship obtained by the relationship evaluation unit 220, the determination unit 230 determines whether processing of the content has been performed, and if it has, determines the type of processing that was performed (step 804).

An explanation will now be given for several example embodiments of the invention applied for specific content data. In the first example, given for a case in which use of music content, data compression and analogue copying (copying of analog data obtained by conversion) are detected while each is distinguished from the other. In this example, a copy of music content prepared as digital data is prevented from being recorded as a source. Thus, in this example, two objects of electronic watermarking are as follows:

1) To inhibit the recording of music content that has been compressed by using a speech compression technique; and
2) To permit the recording of music content for which only analog copying has been employed. The inhibition of the recording of music content that has been compressed using a speech compression technique, is based on the assumption that generally, to reduce data size before music content is distributed via a network, speech compression of the music content is performed.

To achieve the above two objects, the following two types of electronic watermarks, $A(x_r)$ and $B(x_f)$ must be embedded in music content.
1. Electronic watermark $A(X_r)$ a robust electronic watermark that is not destroyed and is maintained even when music content is compressed using a speech compression technique.
2. Electronic watermark $B(x_f)$: a semi-fragile electronic watermark that resists the effects produced by the analog copying of music content, but that is destroyed (deleted) when a speech compression technique is used to compress the music content.

Generally, during the speech data compression of music content, a process that has little affect on the release of sound is performed to remove data in a high frequency band. While on the contrary, during digital/analog conversion and analog/digital conversion a process is performed that adds noise to all the speech data frequency bands. Therefore, the electronic watermark $A(x_r)$ is defined as an electronic watermark that is not deteriorated when subjected to digital/analog conversion and analog/digital conversion and that is embedded only in low frequency speech data bands, and the electronic watermark $B(x_f)$ is defined as an electronic watermark that is embedded only in high frequency speech data bands that are erased by speech compression.

In the embedding apparatus, the watermark design unit 110 and the embedding signal generators 121 to 123 produce embedding signals that satisfy the above conditions and synthesize the signals with speech data. In this manner, the electronic watermarks $A(x_r)$ and $B(x_f)$ can be embedded in music content.

Robust individual embedding information, which is to be embedded as either the electronic watermark $A(x_r)$ or the electronic watermark $B(x_f)$, can be arbitrarily designed so long as it can resist the effects produced by digital/analog conversion and analog/digital conversion. As is described above, the design of embedding information may depend on a predetermined key or content data, or predetermined message information may be included in the embedding information. The relationship between the electronic watermarks $A(x_r)$ and $B(x_f)$ can also be arbitrarily established, with the same value, for example, being set for the values of the electronic watermarks $A(x_r)$ and $B(x_f)$ at predetermined locations in the music content.

It should be noted that the embedding apparatus can be employed at various steps before music content is actually provided; e.g., a step of producing music content, a step of distributing music content via a network, or a step of recording music content on a CD (Compact Disk).

To achieve the above objects for examining an electronic watermark and determining whether recording is permitted or inhibited, typically the detection apparatus is mounted in a recording apparatus, and the individual detectors 211 to 213 first obtain the detection results for the electronic watermarks $A(x_r)$ and $B(x_f)$. Thereafter, the relationship evaluation unit 220 evaluates the relationship between the electronic watermarks $A(x_r)$ and $B(x_f)$, and when it is found that one of the electronic watermarks $A(x_r)$ and $B(x_f)$ has been destroyed or has been replaced by another electronic watermark, it can be ascertained that the relationship existing between the electronic watermarks $A(x_r)$ and $B(x_f)$ has been destroyed.

Finally, based on the results obtained by the relationship evaluation unit 220, the determination unit 230 determines whether the recording of the music content should be permitted or inhibited. Specifically, first, when an electronic watermark $A(x_r)$ that it has been established is sufficiently robust is not detected, it is ascertained that the arbitrary recording of music content is acceptable (the music content is assumed not to be a target for the detection of an electronic watermark) and recording is permitted. But when an electronic watermark $B(x_f)$ that it has been established is not sufficiently robust is not detected, even though an electronic watermark $A(x_r)$ is detected, it is ascertained that speech compression processing of the music content has been performed and recording is inhibited. Further, assuming that electronic watermarks $A(x_r)$ and $B(x_f)$, both of which are sufficiently robust, are detected, and that, as the relationship between the two electronic watermarks $A(x_r)$ and $B(x_f)$, the same value (0 or 1) was employed for $x_r$ and $x_f$ in these electronic watermarks when they were embedded, at the same locations in the music content, if the values of $x_r$ and $x_f$ in the detected electronic watermarks $A(x_r)$ and $B(x_f)$ match, it is ascertained that the relationship between the electronic watermarks $A(x_r)$ and $B(x_f)$ has been maintained and recording is permitted. On the contrary, if the values of $x_r$ and $x_f$ in the detected electronic watermarks $A(x_r)$ and $B(x_f)$ do not match, it is ascertained that the relationship between the electronic watermarks $A(x_r)$ and $B(x_f)$ has been destroyed and, since either electronic watermark $A(x_r)$ or $B(x_f)$ has been altered, recording is inhibited.

For a determination of whether the relationship between the electronic watermarks $A(x_r)$ and $B(x_f)$ has been maintained, the electronic watermarks $A(x_r)$ and $B(x_f)$ in music content may be detected multiple times, and if the number of matching values $x_r$ and $x_f$ is statistically significant, it may be ascertained that the relationship has been maintained, whereas if the number of times the values of $x_{r\ and\ xf}$ match is not statistically significant, it may be ascertained that the relationship has been destroyed.

Permission or inhibition of the recording of music content has been described in this example. However, the detection apparatus may be mounted in a music content replay apparatus in order to prevent the spread of music content that has been illegally processed (speech compression, etc.), and the replaying of music content for which electronic watermarks, or a relationship among them, has been destroyed may be inhibited.

A description is now b given for a second example wherein video content, such as a movie, including moving pictures and speech, is employed and wherein the insertion of subtitles, the dubbing of speech and analog copying are detected and can be distinguished. In this example, copying while using, as a source, video content that has been translated without permission into another language is prevented. Therefore, in this example, the following three objects for electronic watermarking are:

(1) the inhibition of the copying of video content that has been processed in order to insert subtitles;
(2) the inhibition of the copying of video content that has been processed in order to change speech; and
(3) the permission of analog copying.

To achieve these objects, the following three electronic watermarks $C(x_r)$, $D(x_f)$ and $E(x_a)$ are embedded in video content.

1. Electronic watermark $C(x_r)$: a robust electronic watermark that is embedded throughout the moving picture data, and that is resistant to analog copying and various other types of processing;
2. Electronic watermark $D(x_f)$: a fragile electronic watermark that is embedded in a location whereat a subtitle is inserted in a moving picture, and that, while it is resistant to analog copying, is easily destroyed by a variety of processes.
3. Electronic watermark $E(x_a)$: an electronic watermark that is embedded throughout the speech data, and that is resistant to analog copying.

A subtitle is inserted at the bottom or at the right or the left side of a screen of video content for a moving picture, so that an image on the screen is disrupted as little as possible. Thus, the electronic watermark $D(x_f)$ is defined as an electronic watermark that is to be embedded only in image data that correspond to the positions of subtitles.

In the embedding apparatus, the watermark design unit 110 and the embedding signal generators 121 to 123 generate an embedding signal that satisfies the above condition, and synthesizes of the moving picture data, of the video content, with the speech data. As a result, the electronic watermarks $C(x_r)$, $D(x_f)$ and $E(x_a)$ are embedded in the video content. So long as the individual embedding information can robustly resist analog copying (digital/analog conversion and analog/digital conversion), it may be arbitrarily designed so that it can be embedded as the electronic watermark $C(x_r)$, $Dx_f$ or $E(x_a)$ in the video content. As is described above, the design of the individual embedding information may depend on a predetermined key or content data, or may include predetermined message information. Furthermore, the relationship between the electronic watermarks $C(x_r)$, $D(x_f)$ and $E(X_a)$ may be arbitrarily established.

Assume that an arbitrarily robust electronic watermark is selected as the electronic watermark $C(x_r)$ and is embedded multiple times in the moving picture data for the video content. The value $x_f$ of the electronic watermark $D(x_f)$ can be set using expression 1.

[Expression 1]

$$x_f \equiv \sum_{t=-1}^{-T}(x_{t,r})(\mathrm{mod}\,2)$$

In expression 1, $(x_{t,r})$ represents the value of the t-th $(x_r)$ value selected from the past T occurrences (−1 to −T). That is, expression 1 indicates that the remainder, obtained by dividing the sum of the $(x_r)$ values for the past T occurrences by two, is $x_f$.

Further, by employing expression 2 the value $x_a$ of the electronic watermark $E(x_a)$ can be set using a predetermined key k.

[Expression 2]

$$x_a = k + x_r (\mathrm{mod}\,2)$$

the embedding apparatus can be employed at various steps before the video content is actually provided; e.g., at the step for the generation of video content, at the step for the distribution of video content via a network, or at the step for the recording of the video content on a recording medium, such as a DVD (Digital Versatile disk).

To achieve the above objects for examining the electronic watermarks before permitting or inhibiting copying, typically, the detection apparatus is mounted on a recording apparatus. First, the individual detectors 211 to 213 obtain the detection results for the electronic watermarks $C(x_r)$, $D(x_f)$ and $E(x_a)$, and then, the relationship evaluation unit 220 evaluates the relationships established among the electronic watermarks $C(x_r)$, $D(x_f)$ and $E(x_a)$. When one of the electronic watermarks $C(x_r)$, $D(x_f)$ and $E(x_a)$ is either destroyed or is replaced by another electronic watermark, it is ascertained that the relationships among the electronic watermarks $C(x_r)$, $D(x_f)$ and $E(x_a)$ have been destroyed.

Finally, based on the evaluation results obtained by the relationship evaluation unit 220, the determination unit 230 determines whether recording should be permitted or inhibited. Specifically, first, when the robust electronic watermark $C(x_r)$, which possesses sufficient resistance, is not detected, it is ascertained that arbitrary copying of the video content is acceptable (the video content is not a target for the detection of an electronic watermark) and copying is permitted. When the electronic watermark $D(x_f)$, which does not possess sufficient resistance, is not detected, even though the electronic watermark $C(x_r)$ has been detected, it is ascertained that a subtitle has been inserted into the moving picture data and copying is inhibited. When both the electronic watermarks $C(x_r)$ and $D(x_f)$, which exhibit sufficient resistance, are detected, if expression 1 is established as the relationship between the electronic watermarks $C(x_r)$ and $D(x_f)$, and if the value $x_f$ of the detected electronic watermark $D(x_r)$, does not match the value $x'_f$ obtained by expression 3, it is ascertained that the relationship between the electronic watermarks $C(x_r)$ and $D(x_f)$ has been destroyed, and that either the electronic watermark $C(x_r)$ or the electronic watermark $D(x_f)$ may have been altered, and copying is inhibited.

[Expression 3]

$$x'_f \equiv \sum_{t=-1}^{-T} (x_{t,r})(\text{mod}2)$$

When both the electronic watermarks $C(x_r)$ and $E(x_a)$ have sufficient resistance and both are detected, if expression 2 is established as the relationship between the electronic watermarks $C(x_r)$ and $E(x_a)$, and if the value $x_a$ of the detected electronic watermark $E(x_a)$ does not match the value $x'_a$, obtained by expression 4, it is ascertained that the relationship between the electronic watermarks $C(x_r)$ and $E(x_a)$ has been destroyed and that either the electronic watermark $C(x_r)$ or the electronic watermark $E(x_a)$ may have been altered, and copying is inhibited.

[Expression 4]

$$X'_a = k + x_r (\text{mod})$$

Further, when all the electronic watermarks $C(x_r)$, $D(x_f)$ and $E(x_a)$ exhibit sufficient resistance and all are detected, if expression 1 is established as the relationship between the electronic watermarks $C(x_r)$ and $D(x_f)$ and expression 2 is established as the relationship between the electronic watermarks $C(x_r)$ and $E(x_a)$, if the value $x_f$ of the detected electronic watermark $D(x_f)$ matches the value $x'_f$ obtained by expression 3, and if the value $x_a$, of the detected electronic watermark $E(x_a)$ matches the value $x'_a$, obtained by expression 4, it is ascertained that the relationships among the electronic watermarks $C(x_r)$, $D(x_f)$ and $E(x_a)$ has been maintained, and copying is permitted.

To determine whether the relationship between the electronic watermarks $C(x_r)$ and $D(x_f)$ has been maintained, the electronic watermarks $C(x_r)$ and $D(x_f)$ may be detected multiple times in the video content, and when the number of times whereat the values of $x_f$ and $x'_f$ match is statistically significant, it may be ascertained that the relationship has been maintained, while when the number of times whereat the values of $x_f$ and $x'_f$ match is not statistically significant, it may be ascertained that the relationship has been destroyed.

Similarly, for the determination of whether the relationship between the electronic watermarks $C(x_r)$ and $E(x_a)$ has been maintained, the electronic watermarks $C(x_r)$ and $E(x_a)$ may be detected multiple times in the video content, and when the number of times whereat the values of $x_a$ and $x'_a$ match is statistically significant, it may be ascertained that the relationship has been maintained, while when the number of times whereat the values of $x_a$ and $x'_a$ match is not statistically significant, it may be ascertained that the relationship has been destroyed.

In this example, the permission or inhibition of the copying of video content has been explained. The detection apparatus may be mounted in the video content replay apparatus in order to prevent unauthorized processes (the insertion of the subtitle and the dubbing of the speech), and the replaying of video content for which electronic watermarks and relationships have been destroyed may be inhibited.

A description is now given for a third example for the detection of the deletion of watermark information by content averaging, which is one of the common attacks to which content, in which electronic watermarks are embedded, is subjected. According to the electronic watermarking for the addition of watermark information for which the values deviate from the values of content data, multiple content examples, in which an electronic watermark for which different watermark information is provided are embedded, is collected and averaged, so that the watermark information can be deleted as is shown in expression 5.

[Expression 5]

$$\frac{1}{N}\sum_{i}^{N}(C + Wm_i) = C + \frac{1}{N}\sum_{i}^{N} Wm_i$$

$$\frac{1}{N}\sum_{i}^{N} Wm_i \to 0$$

In expression 5, C denotes content data and $Wm_i$ denotes an electronic watermark.

The content from which the watermark information has been deleted would be handled as content in which an electronic watermark was not originally embedded. In this embodiment, therefore, an electronic watermark that is deleted by averaging and an electronic watermark that is resistant to averaging are employed together to detect whether an averaging process has been performed for the content.

For the detection of data showing that averaging processing has been performed for content, the following two electronic watermarks, F and G, are embedded in the content.

1. Electronic watermark F: an electronic watermark that is maintained even when averaging processing is performed.
2. Electronic watermark G: an electronic watermark that is sufficiently robust to resist predetermined, permitted processing, but that averaging will delete.

In this example, no message is included in the electronic watermark F, and the electronic watermark F is prepared based on a predetermined key and content data c. That is, the same electronic watermark, F=constant(c,k), is repeatedly embedded in the same content. Thus, even by collecting and averaging multiple contents in which an electronic watermark, for which different watermark information is supplied, is embedded, the electronic watermark F(constant(c, k)) always retained, as is shown by expression 6.

[Expression 6]

$$\frac{1}{N}\sum_{i}^{N}(C + WmF + Wm_i) = C + WmF + \frac{1}{N}\sum_{i}^{N} Wm_i$$

$$\frac{1}{N}\sum_{i}^{N} Wm_i \to 0$$

In addition, any form may be employed for the electronic watermark G so long as it is deteriorated by the performance of averaging processing, while an arbitrary relationship may be established between the electronic watermarks G and F. In this example, assume that the electronic watermark G is produced by expression 7, based on the electronic watermark F, a predetermined message m, a key k and content data c.

[Expression 7]

$$WmG = f(WmF, m, c, k)$$

In expression 7, f is an arbitrary function.

In the embedding apparatus, the watermark design unit 110 and the embedding signal generators 121 to 123 generate embedding signals that satisfy the above condition, and synthesize the embedding signals with the content data of a content. As a result, the electronic watermarks F and G are embedded in the content. In the detection apparatus, the individual detectors 211 to 213 obtain the individual detection results for the electronic watermarks F and G, and the determination unit 230 determines whether averaging processing has been performed for the content. That is, when only the electronic watermark F that is detected is sufficiently robust, it is ascertained that the average processing has been performed for the content.

A description is now given for a fourth example of the embedding of an electronic watermark that is designed to be meaningful when processing of the content can be detected, and for detecting that processing of the content has been performed. In this case, how content data will be changed by the detection of processing is predicted, and an electronic watermark that is embedded in the content is designed to become meaningful when it is changed. Specifically, for music content which is stereo recorded for two channels, predetermined information is embedded in the two channels. When the music content is down-mixed to monophonic, the message that the down-mixing processing has occurred is embedded as an electronic watermark.

In this case, in the embedding apparatus, the watermark design unit 110 and the embedding signal generators 121 to 123 generate embedding signals, one signal of which, as an electronic watermark, is divided along the time axis. The synthesis unit 130 then separately embeds the embedding signals in the two channels. When the music content is down-mixed to monophonic, since the embedding signals are synthesized by down-mixing, the detection apparatus detects an electronic watermark indicating that down-mixing has been performed.

Figure 9:
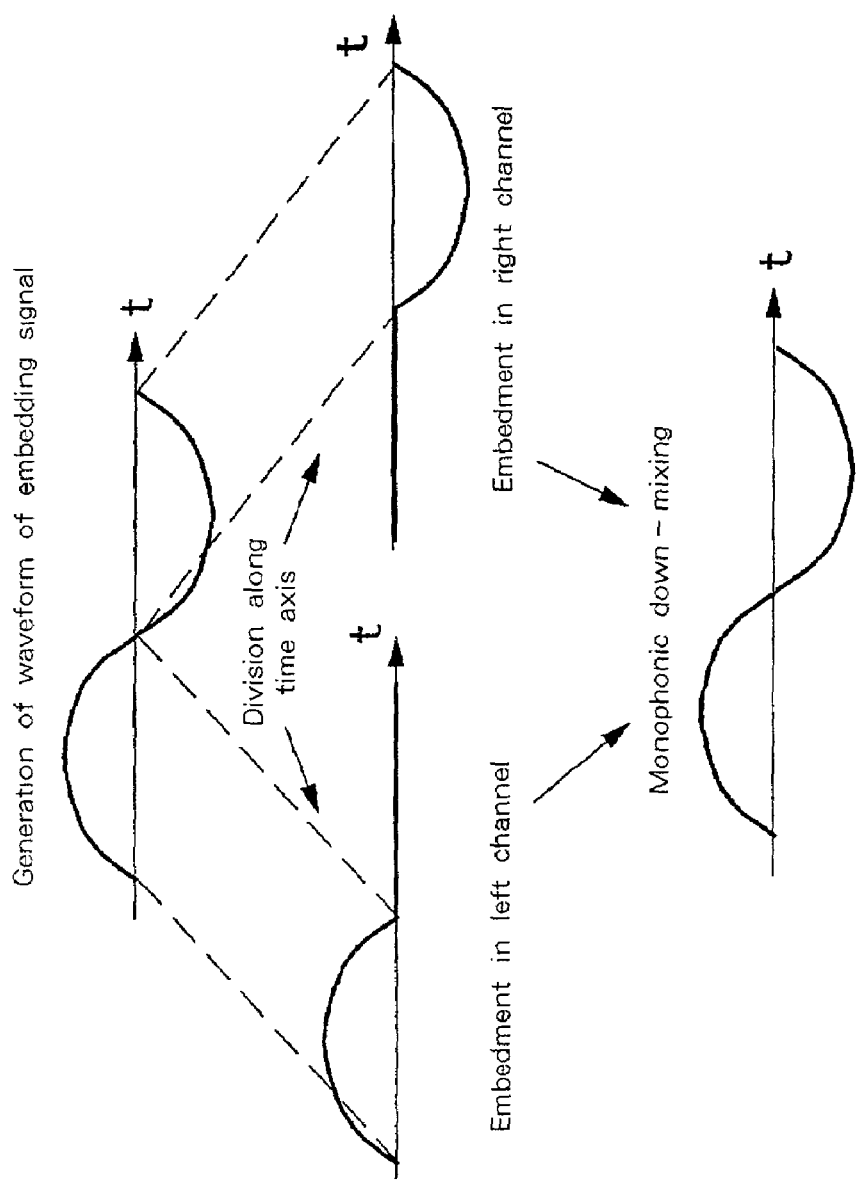
FIG. 9 is a diagram showing an example of the state wherein embedding signals embedded separately in two channels are synthesized by down-mixing to monophonic to obtain a meaningful signal as an electronic watermark.

FIG. 9 is a diagram showing an example of the state wherein the embedding signals embedded separately in the two (right and left) channels are synthesized with a signal that becomes meaningful as an electronic watermark as a result of the down-mixing. Modifications of this embodiment will now be described. In this embodiment, the relationship evaluation unit 220 of the detection apparatus has evaluated the relationships existing among the electronic watermarks embedded in the content. However, when the information concerning the method for embedding information is reflected by the relationships exhibited by the embedded information, the method for obtaining the detection results from the individual detectors 211 to 213 can be controlled. Specifically, based on the detection results (predetermined embedding information detected from content) obtained by a predetermined individual detector (e.g., the detector 211), the detection results (other information detected in the content) obtained by another individual detector (e.g., the detector 212 or 213) are obtained.

Figure 10:
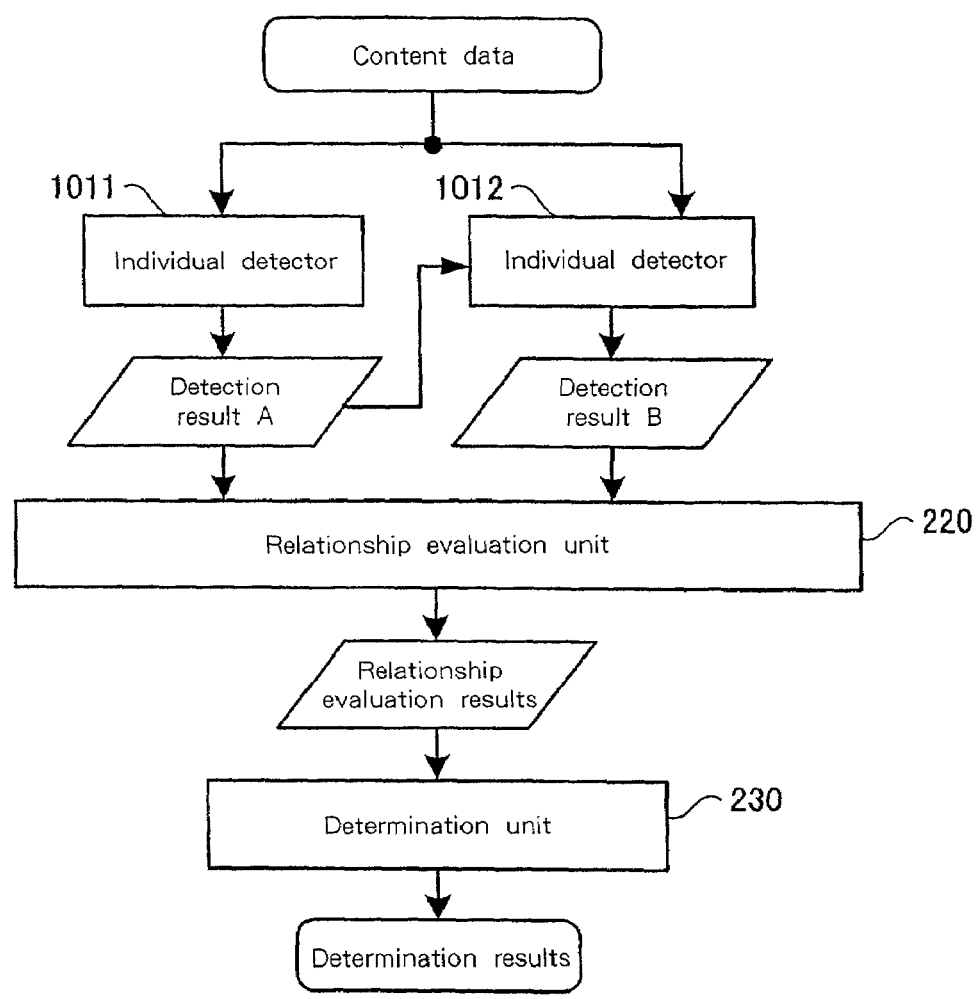
FIG. 10 is a diagram showing an example of the configuration of the detection apparatus for a case wherein information concerning the method for embedding information is reflected in the relationships existing among sets of embedded information.

FIG. 10 is a diagram showing an example configuration of the detection apparatus. In FIG. 10, the detection results obtained by a detector 1011 are transmitted to a detector 1012, and a detection method used by the detector 1012 is changed in accordance with the detection results obtained by the detector 1011. Therefore, the calculation cost required for the detection of an electronic watermark, and the amount of data required for the electronic watermark embedded in the content can be reduced. These will be explained by referring to specific examples.

First, a description is given for a method for reducing the calculation cost required for the detection of an electronic watermark. For example, when an electronic watermark is embedded in music content multiple times, and when the music content is not processed, any of the embedded electronic watermarks may be detected. Thus, an electronic watermark can be searched for and detected at an arbitrary location in the music content. Further, assume that multiple electronic watermarks corresponding to the reduction ratio are embedded in order to detect the processing for the reduction of the size of the screen display provided by the video content. So long as the degree of reduction can be roughly obtained by specific means, only electronic watermarks that correspond to the ratio near the obtained degree need be detected, so that the reduction ratio for the reduction process of the video content can be obtained.

As is described above, depending on the type of processing to be detected and the state of the content, the objective of the electronic watermark may be achieved without all the embedded electronic watermarks being detected. In this case, the required calculation cost for the detection of an electronic watermark can be reduced. However, when predetermined processing has been performed for these contents, the above described method for detecting only a part of embedded electronic watermarks can not be employed. When, for example, music content has been reduced or shifted, all of the content must be searched, from the beginning, in order to detect multiple types of electronic watermarks in the content. When the degree of the reduction of the video content can not be obtained, all the electronic watermarks embedded in the video content must be detected and the reduction ratio must be examined.

Hereinafter, the mode for detecting all the electronic watermarks embedded in content is herein referred to as a high-cost detection mode, and the mode for detecting only a part of electronic watermarks embedded in the content is called a low-cost detection mode. By employing, as an example, video content, such as a movie that includes speech and moving pictures, an explanation will be given for the separate usage of the high-cost detection mode and the low-cost detection mode.

An electronic watermark (A) that is especially robust relative to various processing can be added to the speech data of the video content. Assume in this instance that whether the video content has been deteriorated can be identified by detecting the electronic watermark (A). Assume further that an electronic watermark (B), which can robustly withstand the reduction or shifting of data and that requires the high-cost detection mode for content that has been reduced or shifted, is added to the moving picture data. The detection apparatus includes the individual detectors 1011 and 1012. The detector 1011 outputs the detection results obtained for the electronic watermark (A), and the detector 1012 outputs the detection results obtained for the electronic watermark (B).

To detect the electronic watermarks under the above conditions, first, the detector 1011 detects the electronic watermark (A). When the electronic watermark (A) is not detected, it is ascertained that deterioration of the video content has occurred and the processing is thereafter terminated; the detector 1012 does not initiate the detection of the electronic watermark (B). When the electronic watermark (A) is detected and the video content has not been deteriorated, it is ascertained that the video data has not been reduced or shifted, and the detector 1012 detects the electronic watermark (B) in the low-cost detection mode. When the electronic watermark (A) is detected and the video data has been deteriorated, it is ascertained that the video data has been reduced or shifted, and the detector 1012 detects the electronic watermark (B) in the high-cost detection mode. Since the mode in which the detector 1012 detects the electronic watermark (B) is changed in this manner, the required calculation cost for the electronic watermark detection can be reduced.

An example of a method for reducing the amount of data required for an electronic watermark will now be described. As means for reducing the amount of data to be embedded as an electronic watermark, information used in common for multiple electronic watermarks can be deleted. The information used in common is a synchronization signal indicating the head position of the electronic watermark or information concerning the reduction ratio and the shift value. The reduction ratio and the shift value are parameters concerning a reduction process or a data shifting process performed when the display size of the video content is changed.

This information that is used in common (hereinafter referred to as common information) is included in only one specific electronic watermark, and other electronic watermarks are detected using the common information that is obtained by detecting the specific electronic watermark. The electronic watermark in which the common information is included should be a robust electronic watermark, or an electronic watermark that is especially resistant to the processing performed for content. Further, from the viewpoint of the reduction of the calculation cost required for electronic watermark detection, the common information may be included in an electronic watermark for which only an especially small calculation cost is required for detection.

Figure 11:
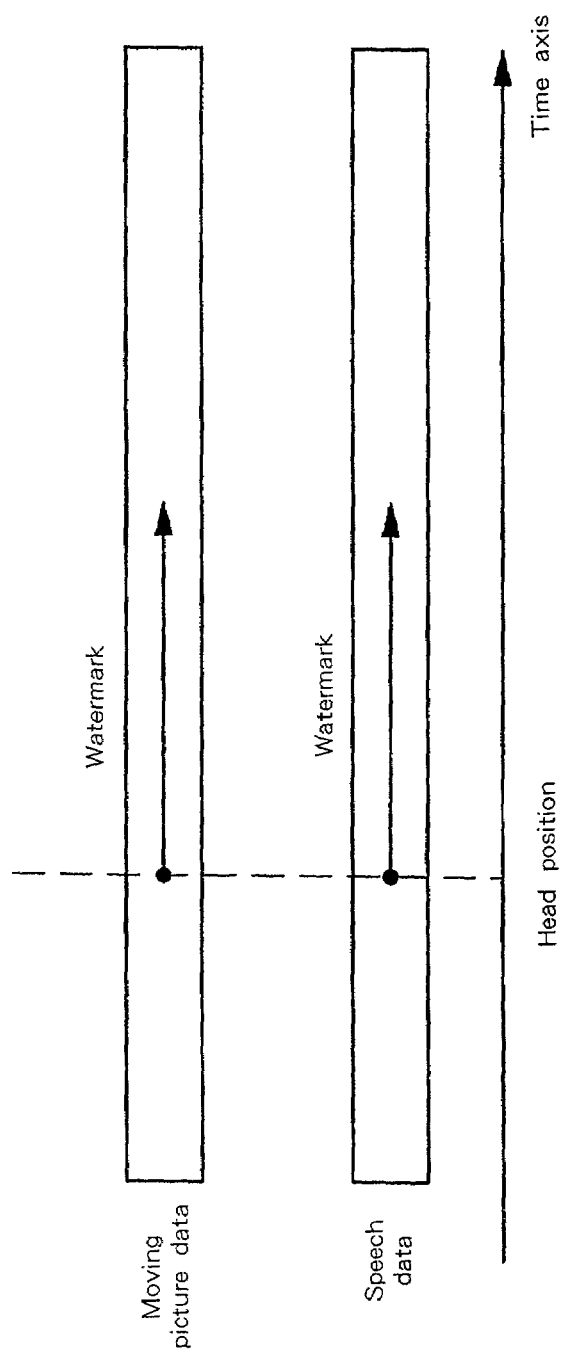
FIG. 11 is a diagram showing an example of the state wherein data strings of electronic watermarks are embedded in video content, including speech and moving pictures, so that the data strings match the speech data and the moving picture data at positions along the time axis.

An example describing the processing will now be specifically explained. Assume that target content is video content, such as a movie, including speech and moving pictures. As is shown in FIG. 11, an electronic watermark is embedded in the speech data and the moving picture data, so that the heads of the data strings of the electronic watermarks are located at the same locations in the video content along the time axis.

In addition, synchronization information is included only in the electronic watermark embedded in the speech data. The detection apparatus includes the detectors 1011 and 1012. The detector 1011 outputs the detection results obtained for the electronic watermark embedded in the speech data, and the detector 1012 outputs the detection results obtained for the electronic watermark embedded in the moving picture data. For detection of the electronic watermarks under the above conditions, first, the detector 1011 detects the electronic watermark embedded in the speech data of the video content. Then, the detector 1012 employs the synchronization information included in the electronic watermark to detect the electronic watermark embedded in the moving picture data. Through this processing, the amount of data required for the electronic watermarks can be reduced by including common information in the data provided for only one specific electronic watermark.

In the above two modifications, to explain it simply, only two detectors (1011 and 1012) are provided, and for the detection of the two electronic watermarks, the detection results obtained for one electronic watermark are employed to detect the other electronic watermark. However, the same method can be applied for the detection of three or more types of electronic watermarks. In this case, the detection results obtained for one specific electronic watermark may be employed for the detection of all the other electronic watermarks, or the detection results may be used in a cascading manner: the detection results obtained for one electronic watermark may be employed for the detection of another electronic watermark, and the results obtained by that detection may then be used for the detection of a succeeding watermark.

Figure 12:
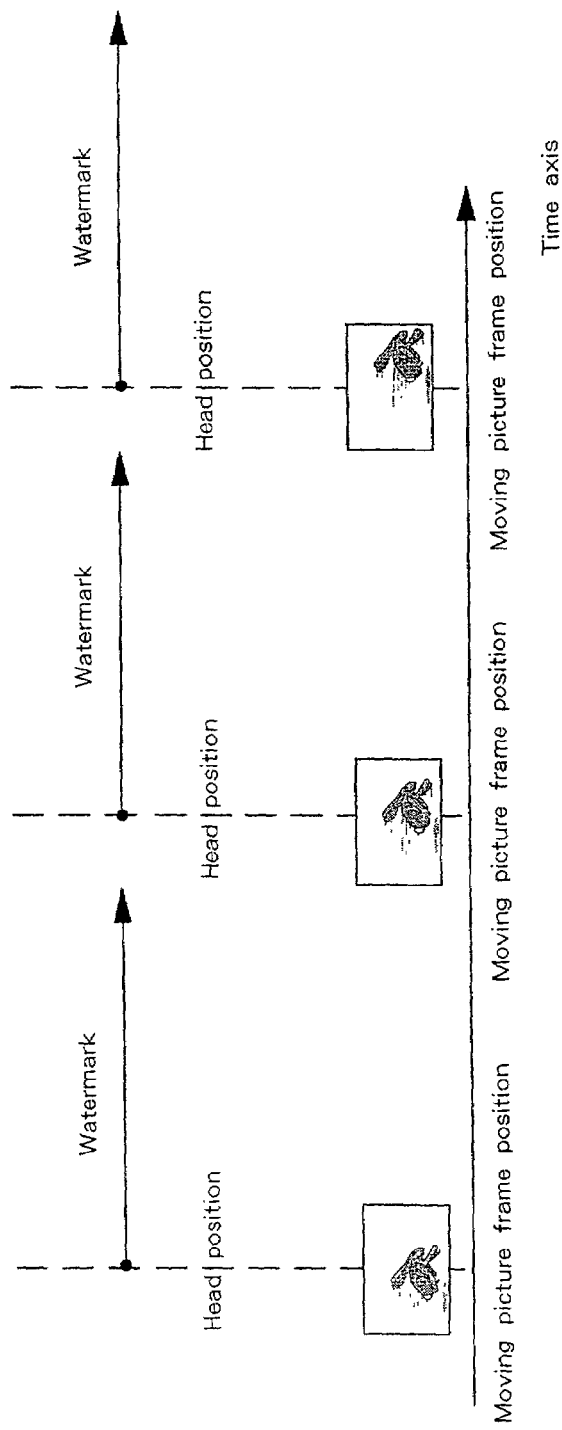
FIG. 12 is a diagram showing an example of the state wherein data strings, for electronic watermarks, are embedded so that the positions of the frames of moving picture data match the head positions of the data strings.

In addition to the above modifications, the amount of electronic watermark data can be reduced when the electronic watermark depends on the number of content data characteristics. For example, for video content, such as a movie, including speech and moving pictures, the frames of the moving picture data stream are correlated with the frames of the speech data stream in time series. Thus, as is shown in FIG. 12, an electronic watermark is embedded in the speech data, so that the position of each frame of the moving picture data matches the head of the data string of each electronic watermark. Therefore, when the electronic watermark is detected at the frame position in the moving picture data, the data can be detected from the head of the data string of the electronic watermark. Since the synchronization information need not be included in the electronic watermark, the amount of data required for the electronic watermark can be reduced. Further, in this case, since the head position of the data string of the electronic watermark can be accurately obtained based on the content data, a comprehensive search need not be performed to obtain the data strings of the electronic watermarks.

As is described above, according to the present invention, by using multiple electronic watermarks, it is possible to determine whether content is a target for the detection of the treatment thereof, to identify and detect the processing performed and type of content, and to prevent the copying and the processing of content from being hidden. The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A data processing detection system comprising:
   an embedding apparatus, for adding a predetermined additional signal to content data for digital content, including:
      additional signal generation means, for generating multiple additional signals, which differ in robustness from each other as for the processing of said content data, said additional signals being related to each other by a predetermined function dependent on a data string, the data string forming a predetermined message;
      addition means, for adding said multiple additional signals to said content data; and
   a detection apparatus, for detecting said additional signals added to said content data, including:
      additional signal detection means, for detecting, in said content data, said multiple additional signals, and
      determination means, for examining, based on said additional signals detected by said additional signal detection means, the deterioration levels of said additional signals to determine the type of processing performed for said content data.

2. The data processing detection system according to claim 1, wherein said additional signal generation means, of said embedding apparatus, generates multiple additional signals correlated with each other; and wherein said detection apparatus further includes relationship evaluation means for determining whether the relationships among said additional signals have been maintained.

3. The data processing detection system according to claim 1, wherein said additional signal detection means detects said additional signals embedded in said content data multiple times; and wherein said determination means statistically processes said additional signals, performing the detection process multiple times, and determines that said content data has been processed and the type of processing performed for said content data.

4. A computer program product comprising a computer usable medium having computer readable program code means embodied therein for causing embedding of additional information, the computer readable program code means in said computer program product comprising computer readable program code means for causing a computer to effect the functions of the elements in claim 1.

5. The data processing detection system according to claim 1, wherein the detection apparatus further includes predetermined message detection means, for detecting predetermined message.

6. An additional information embedding apparatus, for adding additional information to digital content to determine whether said digital content has been processed, comprising:
   an additional information generator, for preparing multiple sets of additional information that are correlated with each other;
   an additional signal generator, for generating data, based on said additional information, that corresponds to a predetermined data form for said digital content; and
   a synthesis unit, for synthesizing data generated by said additional signal generator and content data for said digital content,
   wherein, to determine whether said digital content has been processed, said additional information added to said digital content is detected, and the level of deterioration of the obtained additional information is detected,
   wherein the additional information generator establishes a mapping relationship for said additional information defined by a predetermined function, said predetermined function dependent on a data string, the data string forming a predetermined message.

7. The additional information embedding apparatus according to claim 6, wherein, as said relationship for said additional information, said additional information generator establishes a relationship such that specific information can be obtained by performing a predetermined process using multiple sets of additional information as elements.

8. The additional information embedding apparatus according to claim 6, wherein said additional information generator provides, as said relationship for said additional information, information required for the detection of other additional information for said digital content.

9. The additional information embedding apparatus according to claim 6, wherein, based on multiple sets of additional information, said additional signal generator prepares multiple sets of data exhibiting differing resistances to the processing performed for said content data of said digital content.

10. A computer program product comprising a computer usable medium having computer readable program code means embodied therein for causing embedding of additional information, the computer readable program code means in said computer program product comprising computer readable program code means for causing a computer to effect the functions of the elements in claim 6.

11. An additional information detection apparatus, for detecting additional information, added to digital content, to determine whether said digital content has been processed, comprising:
   an individual information detector, for detecting each of multiple correlated additional information sets embedded in content data for digital content;
   a relationship evaluation unit, for evaluating relationships dependent on a data string, the data string forming a predetermined message, among the multiple additional information sets that are obtained; and
   a determination unit, for determining whether said content data has been processed based on the detection and evaluation results.

12. The additional information detection apparatus according to claim 11, wherein, when it is ascertained that said content data has been processed, said determination unit determines the type of the process performed for said content data.

13. The additional information detection apparatus according to claim 11, wherein said individual information detector detects other additional information based on predetermined additional information detected in said content data.

14. The additional information detection apparatus according to claim 11, wherein said individual information detector detects additional information based on the characteristic of the data form of said content data.

15. A computer program product comprising a computer usable medium having computer readable program code means embodied therein for causing detection of additional information, the computer readable program code means in said computer program product comprising computer readable program code means for causing a computer to effect the functions of the elements in claim 11.

16. A music content processing apparatus comprising:
an additional information generator, for generating multiple correlated sets of additional information;
an additional signal generator, for generating, based on said additional information, multiple sets of data that correspond to the data form of music content; and
a synthesis unit, for synthesizing data obtained by said additional signal generator and content data for said music content,
wherein said synthesis unit synthesizes said multiple data sets, so that, at the least, one of said multiple data sets is embedded in a data portion in a high frequency band of said music content, and so that, at the least, another data set of said multiple data sets is embedded in a data portion in a low frequency band of said music content; and
wherein the additional information generator establishes a mapping relationship for said additional information defined by a predetermined function, said predetermined function dependent on a data string, the data string forming a predetermined message.

17. A music content processing apparatus comprising:
an individual information detector, for detecting each of multiple additional information sets embedded in said content data for music content;
a relationship evaluation unit, for evaluating relationships dependent on a data string, the data string forming a predetermined message, among said multiple sets of additional information; and
a determination unit, for determining, based on the detection and evaluation results, whether said content data has been processed, and for determining, when said content data has been processed, the type of processing performed,
wherein, when it is ascertained, based on said relationships among said multiple sets of additional information, that said additional information has been added to data portions in both said high frequency bands and said low frequency bands of said music content, and when said relationships among said multiple sets of additional information have been destroyed or when the deterioration of said additional information embedded in the data portion of said high frequency bands has occurred, said determination unit inhibits the processing of said music content.

18. A computer program product comprising a computer usable medium having computer readable program code means embodied therein for causing processing of music content, the computer readable program code means in said computer program product comprising computer readable program code means for causing a computer to effect the functions of the elements in claim 17.

19. A computer implemented additional information embedding method, for adding additional information to digital content to determine whether said digital content has been processed, comprising the steps of:
generating, by at least one processor, multiple sets of additional information that are correlated with each other and that correspond to the data form of predetermined digital content; and
synthesizing, by the at least one processor, said additional information and content data for said digital content; and
wherein the additional information are correlated with each other by a mapping relationship defined by a predetermined function, said predetermined function dependent on a data string, the data string forming a predetermined message.

20. The additional information embedding method according to claim 19, wherein said step of generating said additional information includes the step of:
generating, when said digital content has been processed, data that becomes significant in accordance with the change accruing from the process performed for said content data.

21. An article of manufacture comprising a computer usable medium having computer readable program code means embodied therein for causing embedding of additional information, the computer readable program code means in said article of manufacture comprising computer readable program code means for causing a computer to effect the steps of claim 19.

22. A program storage device readable by machine, tangibly embodying a program of instructions executable by the machine to perform method steps for embedding of additional information, said method steps comprising the steps of claim 19.

23. The additional information embedding method according to claim 19, wherein the predetermined message includes information about an ideal state of said digital content.

24. The additional information embedding method according to claim 19, wherein the predetermined message is configured to be retrievable during watermark detection.

25. The additional information embedding method according to claim 19, wherein the predetermined message is a key in a key encryption system.

26. A computer implemented additional content detection method, for detecting additional information added to a digital content in order to determine whether said digital content has been processed, comprising the steps of:
detecting, by at least one processor, from content data for digital content, multiple sets of additional information that are correlated with each other, but that in robustness differ from each other;
evaluating, by the at least one processor, relationships dependent on a data string, the data string forming a predetermined message, existing between said multiple sets of additional information; and
determining, by the at least one processor, based on said detected additional information and the evaluation of said relationships, whether said content data has been processed, and determining the type of processing performed when said content data has been processed.

27. An article of manufacture comprising a computer usable medium having computer readable program code means embodied therein for causing detection of additional information, the computer readable program code means in said article of manufacture comprising computer readable program code means for causing a computer to effect the steps of claim 26.

28. A program storage device readable by machine, tangibly embodying a program of instructions executable by the machine to perform method steps for detecting additional information, said method steps comprising the steps of claim 26.

29. A storage medium on which input means of a computer stores a computer-readable program that permits said computer to perform:
- a process for generating multiple sets of additional information that are correlated with each other and that correspond to the data form of predetermined digital content; and
- a process for synthesizing said additional information and content data for said digital content; and
- wherein the additional information are correlated with each other by a mapping relationship defined by a predetermined function, said predetermined function dependent on a data string, the data string forming a predetermined message.

30. A storage medium on which input means of a computer stores a computer-readable program that permits said computer to perform:
- a process for detecting, from content data for digital content, multiple sets of additional information that are correlated with each other, but that in robustness differ from each other;
- a process for evaluating relationships dependent on a data string, the data string forming a predetermined message, existing between said multiple sets of additional information; and
- a process for, based on said detected additional information and the evaluation of said relationships, determining whether said content data has been processed, and determining the type of processing performed when said content data has been processed.

31. A program transmission apparatus comprising:
storage means for storing a program that permits a computer to perform:
- a process for generating multiple sets of additional information that are correlated with each other dependent on a data string, the data string forming a predetermined message, and that correspond to the data form of predetermined digital content, and
- a process for synthesizing said additional information and content data for said digital content; and transmission means for reading said program from said storage means, and for transmitting said program.

32. A program transmission apparatus comprising:
storage means for storing a program that permits a computer to perform:
- a process for detecting, from content data for digital content, multiple sets of additional information that are correlated with each other, but that in robustness differ from each other,
- a process for evaluating relationships dependent on a data string, the data string forming a predetermined message, existing between said multiple sets of additional information, and
- a process for, based on said detected additional information and the evaluation of said relationships, determining whether said content data has been processed, and determining the type of processing performed when said content data has been processed; and transmission means for reading said program from said storage means, and for transmitting said program.

* * * * *

UNITED STATES PATENT AND TRADEMARK OFFICE
CERTIFICATE OF CORRECTION

| | | |
|---|---|---|
| PATENT NO. | : 7,660,991 B2 | Page 1 of 1 |
| APPLICATION NO. | : 09/946408 | |
| DATED | : February 9, 2010 | |
| INVENTOR(S) | : Nakamura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1931 days.

Signed and Sealed this

Thirtieth Day of November, 2010

David J. Kappos
*Director of the United States Patent and Trademark Office*